US012620143B2

(12) United States Patent
Harvill

(10) Patent No.: US 12,620,143 B2
(45) Date of Patent: May 5, 2026

(54) SYSTEM AND METHOD FOR HIGH-QUALITY RENDERINGS OF SYNTHETIC VIEWS OF CUSTOM PRODUCTS

(71) Applicant: Zazzle Inc., Menlo Park, CA (US)

(72) Inventor: Leslie Young Harvill, Olympia, WA (US)

(73) Assignee: ZAZZLE INC., Menlo Park, CA (US)

( * ) Notice: Subject to any disclaimer, the term of this patent is extended or adjusted under 35 U.S.C. 154(b) by 167 days.

(21) Appl. No.: 18/417,548

(22) Filed: Jan. 19, 2024

(65) Prior Publication Data

US 2025/0238967 A1      Jul. 24, 2025

(51) Int. Cl.
*G09G 5/00*          (2006.01)
*G06T 11/00*          (2006.01)
(52) U.S. Cl.
CPC .................................... *G06T 11/00* (2013.01)
(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06F 9/4443; G06F 3/0481; G06F 30/13; G06F 3/04845; G06F 3/04883; G06F 40/143; G06F 16/54; G06F 16/56; G06F 16/5838; G06F 16/58;

(Continued)

(56) References Cited

U.S. PATENT DOCUMENTS 5,999,189  A      12/1999  Kajiya et al.
6,363,404  B1      3/2002  Dalal et al.
(Continued)

FOREIGN PATENT DOCUMENTS

JP          2017-533524  A      11/2017
WO          2020/152701  A1      7/2020

OTHER PUBLICATIONS

Yuxiang Wang et al. "Decoupled Coverage Anti-Aliasing", Internet Citation, Aug. 21, 2015. URL: <https://www.ece.ucsb/psen/papers/wang15_DCAA.pdf.>.

(Continued)

*Primary Examiner* — Gordon G Liu
(74) *Attorney, Agent, or Firm* — Patterson & Sheridan LLP.; Malgorzata A. Kulczycka

(57)          ABSTRACT

In some embodiments, a data processing method for generating a synthetic view rendering of a custom product, the method comprises: initializing, for a digital asset, a coverage mapping array; wherein each member of the coverage mapping array represents a possible coverage of sub-pixel regions of a pixel, and can be held in a scalar instruction register of a computer microprocessor; calculating a distance of each edge of the triangle from a center of a sub-pixel using a single scalar set instruction, operating on a pair of two scalar instruction set registers; using the distance and an angle of the edge to select a member of the array; combining pairs of found members of the coverage mapping array using the single scalar set instruction, operating on the pair, to assemble a sub-pixel coverage map array; rendering the pixel using the sub-pixel coverage mapping array and the sub-pixel regions of the pixel.

20 Claims, 11 Drawing Sheets

(58) Field of Classification Search

CPC ......... G06F 16/55; G06F 40/40; G06V 20/20; G06V 10/7753; G11B 27/10; H04N 21/47217; G16H 30/20; G06N 20/20; G06N 3/045; G06N 3/047; G06N 3/08; G06Q 30/0643

USPC ......................................................... 345/619

See application file for complete search history.

(56) References Cited

U.S. PATENT DOCUMENTS

| | | | |
|---|---|---|---|
| 6,614,444 | B1 | 9/2003 | Duluk, Jr. et al. |
| 6,717,576 | B1 | 4/2004 | Duluk, Jr. et al. |
| 11,257,297 | B1 | 2/2022 | Go |
| 2002/0184110 | A1 | 12/2002 | Shimada |
| 2003/0179197 | A1 | 9/2003 | Sloan et al. |
| 2004/0183817 | A1* | 9/2004 | Kaasila ............... G06F 16/9577 |
| | | | 345/698 |
| 2005/0081161 | A1 | 4/2005 | MacInnes et al. |
| 2005/0155316 | A1 | 7/2005 | Shipley |
| 2006/0122917 | A1 | 6/2006 | Lokuge et al. |
| 2006/0226563 | A1 | 10/2006 | Albert et al. |
| 2007/0083383 | A1 | 4/2007 | Van Bael et al. |
| 2007/0165035 | A1 | 7/2007 | Duluk et al. |
| 2013/0173415 | A1 | 7/2013 | Harvill et al. |
| 2014/0096041 | A1 | 4/2014 | Gowen et al. |
| 2014/0279180 | A1 | 9/2014 | Beaver et al. |
| 2015/0002508 | A1 | 1/2015 | Tatarinov et al. |
| 2015/0006313 | A1 | 1/2015 | Beaver et al. |
| 2016/0063611 | A1 | 3/2016 | Davis et al. |
| 2017/0038767 | A1 | 2/2017 | Cluckers et al. |
| 2017/0357698 | A1 | 12/2017 | Chang et al. |
| 2020/0122406 | A1 | 4/2020 | Bigos et al. |
| 2020/0294271 | A1 | 9/2020 | Ilola et al. |
| 2022/0005099 | A1 | 1/2022 | Mordovskoi et al. |
| 2022/0035970 | A1 | 2/2022 | Cheshire et al. |
| 2022/0129964 | A1* | 4/2022 | Harvill .................... G06F 30/12 |
| 2022/0318873 | A1 | 10/2022 | Han |

OTHER PUBLICATIONS

International Search Report dated Feb. 18, 2025 for Application No. PCT/US2024/053453.

Kumar, Ashok. "From mass customization to mass personalization: a strategic transformation." International Journal of Flexible Manufacturing Systems 19 (2007): 533-547. (Year: 2007).

Non-Final Office Action dated Jun. 5, 2024 for U.S. Appl. No. 17/501,451.

Final Office Action for U.S. Appl. No. 17/501,451, dated Jun. 5, 2024.

Haskin et al., "On extending he functions of a relational database system", Proceeding of the 1982 ACM SIGMOD international conference on Management of data, 1982.

Zhang, Jian et al., "Open interface design for product personalization", CIRP Annals 66.1 (2017), pp. 173-176.

Non-Final Office Action for U.S. Appl. No. 17/501,451 dated Jan. 24, 2023.

Final Office Action for U.S. Appl. No. 17/501,451, dated Aug. 3, 2023.

JP Office Action Dtd May 28, 2025 for JP 2023-523232.

Wang, Charlie CL, Yu Wang, and Matthew MF Yuen. "Design automation for customized apparel products." Computer-aided design 37.7 (2005): 675-691. (Year: 2005).

Office Action dated Dec. 14, 2023 for U.S. Appl. No. 17/501,451.

Notice of Allowance dated Jul. 24, 2025 for U.S. Appl. No. 17/501,451.

Notice of Allowance for U.S. Appl. No. 17/501,451, dated Jun. 6, 2025.

J. Wang, L. Cheng and W. Han, "The effect of default option on customer decision behavior in product customization," 2013 10th International Conference on Service Systems and Service Management, Hong Kong, China, 2013, pp. 85-89, doi: 10.1109/ICSSSM.2013.6602627. (Year: 2013).

Final Office Action for U.S. Appl. No. 17/501,451, dated Feb. 12, 2025.

Zhang, Jian, et al. "Open interface design for product personalization." CIRP Annals 66.1 (2017): 173-176. (Year: 2017).

Non-Final Office Action dated Jan. 14, 2023 for U.S. Appl. No. 17/501,513.

Final Office Action dated Apr. 5, 2023 for U.S. Appl. No. 17/501,513.

Advisory Action dated Jul. 6, 2023 for U.S. Appl. No. 17/501,513.

Notice of Allowance dated Jul. 27, 2023 for U.S. Appl. No. 17/501,513.

* cited by examiner

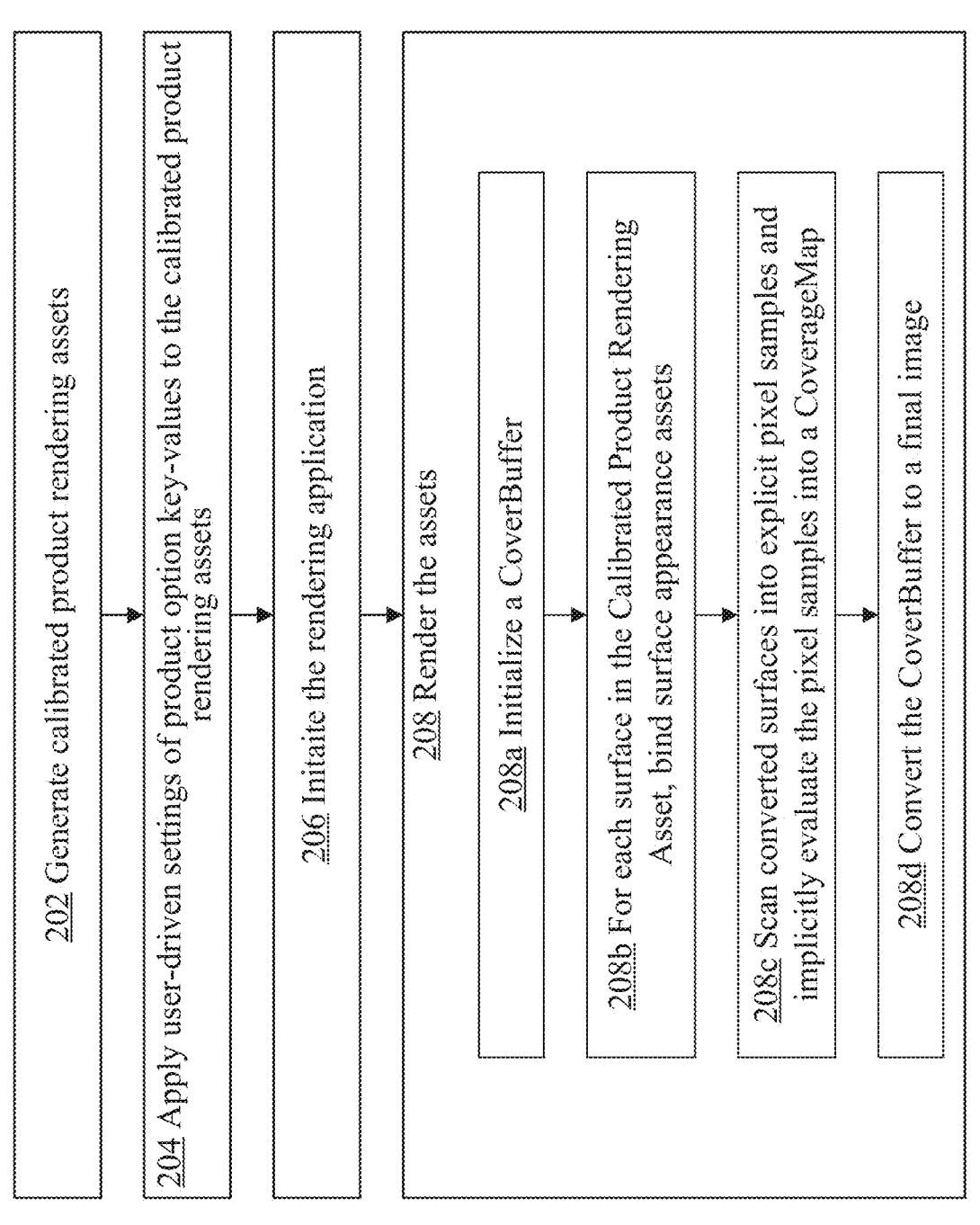

202 Generate calibrated product rendering assets

204 Apply user-driven settings of product option key-values to the calibrated product rendering assets 206 Initaite the rendering application 208 Render the assets 208a Initialize a CoverBuffer 208b For each surface in the Calibrated Product Rendering Asset, bind surface appearance assets 208c Scan converted surfaces into explicit pixel samples and implicitly evaluate the pixel samples into a CoverageMap 208d Convert the CoverBuffer to a final image

FIG. 2

402 Receive data capturing a customized product customized by a user

404 Render the customized product on a display device

406 Render the customized product for a manufacturer

408 Manufacture the customized product

410 Implement a reflection process

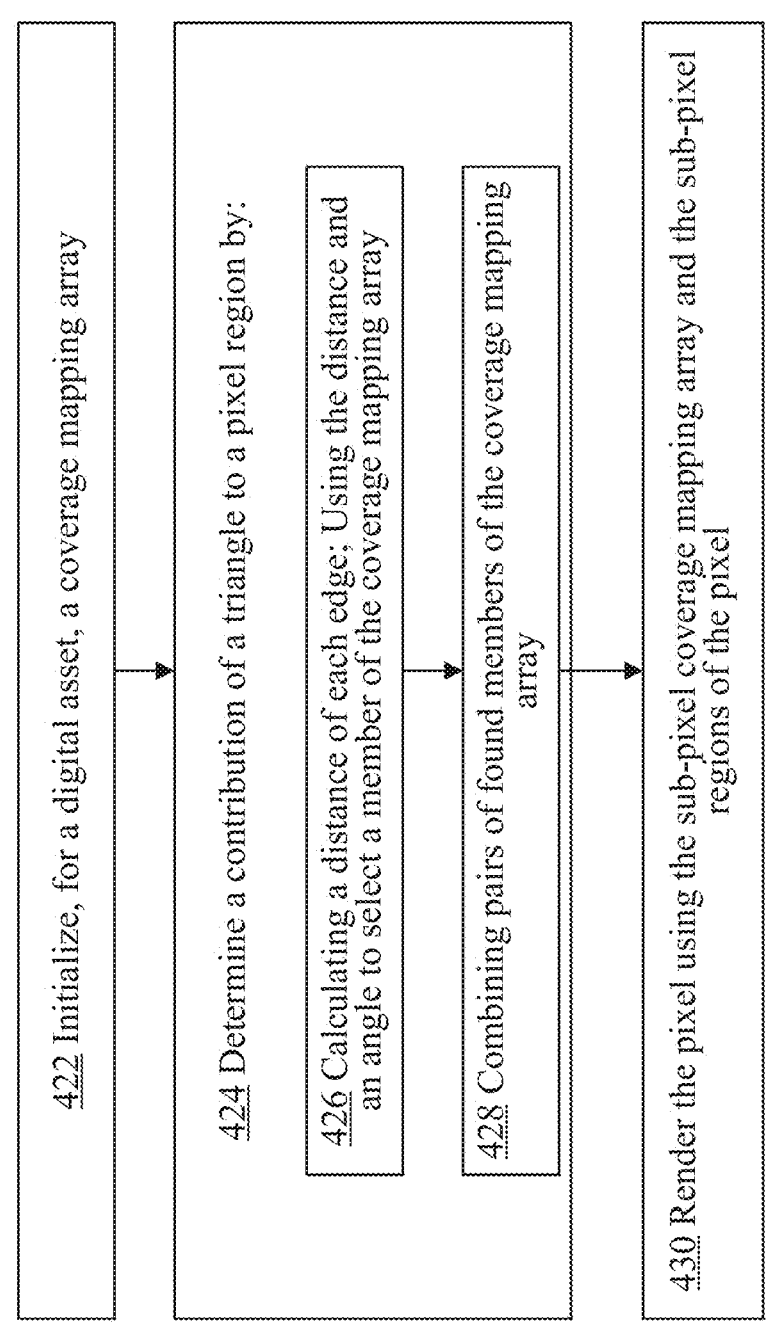

422 Initialize, for a digital asset, a coverage mapping array

424 Determine a contribution of a triangle to a pixel region by:

426 Calculating a distance of each edge; Using the distance and an angle to select a member of the coverage mapping array 428 Combining pairs of found members of the coverage mapping array 430 Render the pixel using the sub-pixel coverage mapping array and the sub-pixel regions of the pixel

FIG. 4B

SYSTEM AND METHOD FOR HIGH-QUALITY RENDERINGS OF SYNTHETIC VIEWS OF CUSTOM PRODUCTS

FIELD OF THE DISCLOSURE

One technical field of disclosure is an approach for automatically configuring custom product options based on user actions monitored and tracked by collaborative computer platforms. Another technical field is tracking the user actions to generate options for customizing products available from the collaborative computer platforms and generating, based on the options, high-quality renderings of synthetic views of custom products.

BACKGROUND

The approaches described in this section are approaches that could be pursued but not necessarily approaches that have been previously conceived or pursued. Therefore, unless otherwise indicated, it should not be assumed that any approaches described in this section qualify as prior art merely by their inclusion.

Many systems on the market are configured to offer the opportunity to order products with customized attributes. For example, in the case of manufactured framed products such as photos, digital images, artwork, and other frameable products, the systems may offer the opportunity to order the images and frames in customized sizes and colors.

Customizing products that have many customizable parameters may be quite challenging. The selection of customization values may have implications on the appearance of the final custom products and how the final custom products are rendered. Therefore, the systems often provide functionalities for displaying depictions, i.e., synthetic views, of the customized products to help the users visualize their customized products before the users order the products.

An example of the product customization process is described in, for example, U.S. Pat. No. 8,175,931 B2, which includes a description of an example user product renderer in FIG. 1B (element 109b), FIG. 1C (element 124), and FIG. 2 (element 134). However, the product customization process described in U.S. Pat. No. 8,175,931 B2 does not disclose the high-quality sub-pixel rendering approach.

Generally, synthetic views are digital depictions of the objects displayed on computer-based display devices. In the context of digital customization of products, it is useful to render synthetic views of the products before the products are manufactured. This allows a user to visually check the product features and decorations before actually ordering the product. Synthetic views are often a combination of imagery from digital photography. They may include, for example, digital markups and synthetic renderings derived from, for example, 2D, 2.5D, and 3D geometry of the objects.

Algorithms for high-quality digital rendering of geometry have been researched and studied for some time. They typically use simulation of light, texture, and color. Major advancements in this technology include work using Scanline Rendering, Binary Space partitioning, zBuffer, aBuffer, Pixar's Reyes rendering system (culminating in the Renderman tool), the wide availability of hardware supporting OpenGL and Direct3D, and improvements in hardware assisted ray-tracing, as implemented in, for example, Intel's Embree rendering system.

Usually, the synthetic digital rendering methods may be grouped based on the application area, rendering speed, and quality needs. For example, the real-time rendering applications for simulation and games typically use carefully designed content and geometry rendered with optimized spatial partitioning on hardware using OpenGL or Direct3D. The rendering time for a frame in a real-time rendering application must be rapid, and usually, the latency appears to be a key barrier to supporting user interactions with the application.

In the entertainment industry, production of imagery for films and prints usually has strict requirements for the quality and creative control. Sometimes, it might be difficult to meet the high quality and artistic requirements. But even if those requirements are met, they are met at the expense of longer rendering times per image.

Rendering synthetic views for custom products falls between these two applications. Such renderings need to be crafted without the expense incurred by optimizing game assets and performed as a user interacts with a product, longer than a twitch game, but much shorter than a movie frame. Therefore, there is a need for providing high-quality rendering techniques for rendering synthetic views of custom products that provide relatively low latencies.

BRIEF DESCRIPTION OF DRAWINGS

FIG. 2 illustrates an example processing flow for rendering synthetic views, according to some embodiments;

DESCRIPTION OF EXAMPLE EMBODIMENTS

In the following description, for explanation, numerous specific details are outlined in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are Described Herein According to the Following Outline:

1.0 OVERVIEW
2.0 STRUCTURAL AND FUNCTIONAL OVER VIEW
3.0 SYNTHETIC VIEW RENDERING
   3.1 REQUIREMENTS
   3.2. CAPTURE BUFFER APPROACH
4.0 SYNTHETIC VIEW RENDERING PROCESS
   4.1 GENERATING CALIBRATED PRODUCT RENDERING ASSETS 4.2 APPLYING USER-DRIVEN SETTINGS OF PRODUCT OPTION KEY-VALUES TO CALIBRATED PRODUCT RENDERING ASSETS 4.3 INITIATING THE RENDERING APPLICATION 4.4 RENDING THE ASSETS 4.5 DISPLAYING THE ASSETS 5.0 COVERAGE MAP 5.1 COVERAGE MAP SERVICE 5.2 COVERAGE-MAPPING 6.0 COVERAGE BUFFER SERVICE 7.0 EXAMPLE METHOD FOR HIGH-QUALITY RENDERINGS OF SYNTHETIC VIEWS OF CUSTOM PRODUCTS 8.0 EXAMPLE RENDERING FLOW 9.0 MANUFACTURING 10.0 IMPLEMENTATION MECHANISMS-HARDWARE OVERVIEW 11.0 EXTENSIONS AND ALTERNATIVES 1.0 General Overview In some embodiments, techniques are described for improving a product customization process. More specifically, the techniques are intended to improve a user product renderer used by the product customization process and produce a product rendering based on a high-quality sub-pixel rendering.

The techniques described herein provide a novel and improved method for high-quality sub-pixel rendering of customized products where the high-quality sub-pixel rendering is one of the critical requirements.

The system and method presented herein can provide a high-quality rendering of synthetic views of any custom product. The system and method can be implemented in software, hardware, or a combination of hardware and software and may also be implemented on a client/server system, a web server, a terminal, a peer-to-peer system, and the like so that the system and method are not limited to the particular implementation of the system or method.

2.0 Structural Overview

Figure 1A:
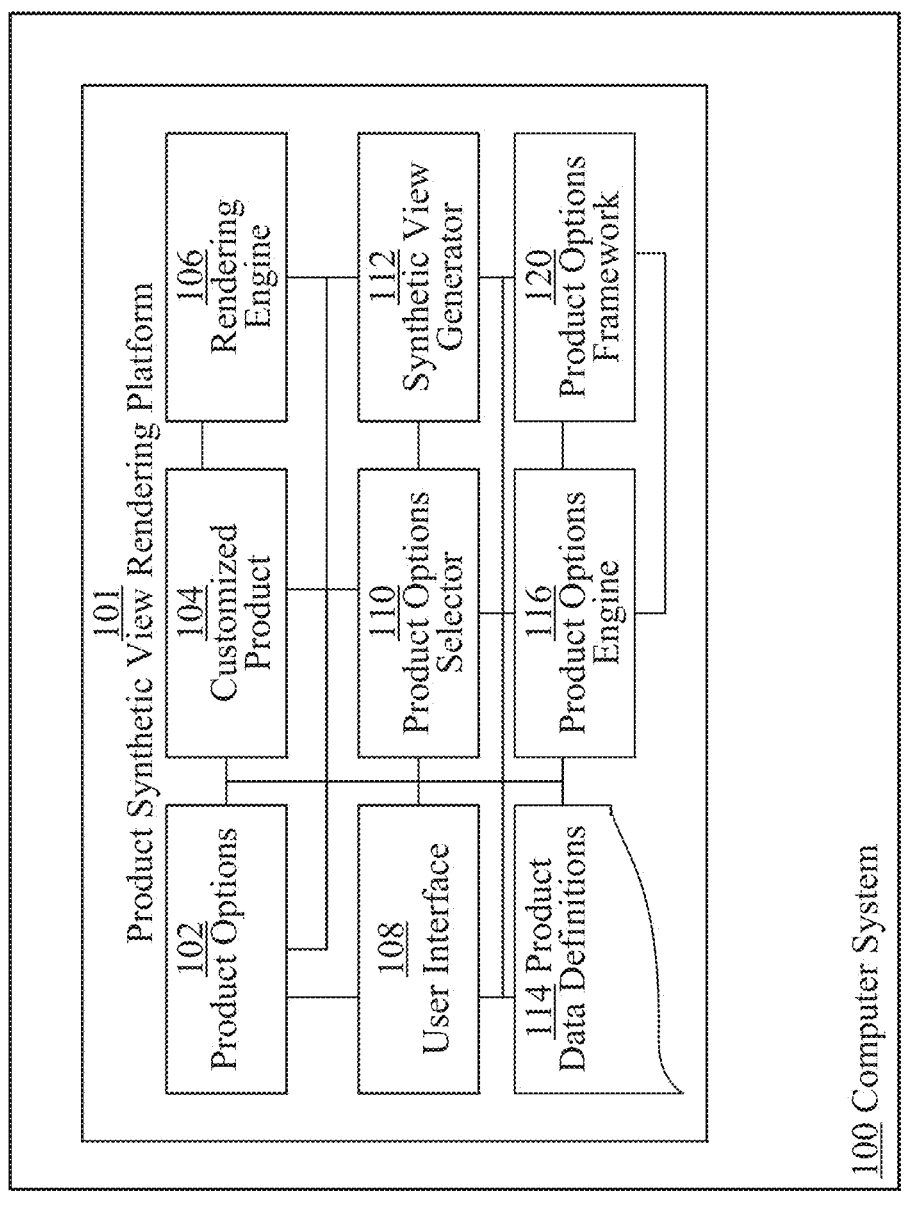
FIG. 1A illustrates an example system for implementing a method for automatically configuring custom product options based on user actions, according to some embodiments.
Figure 1B:
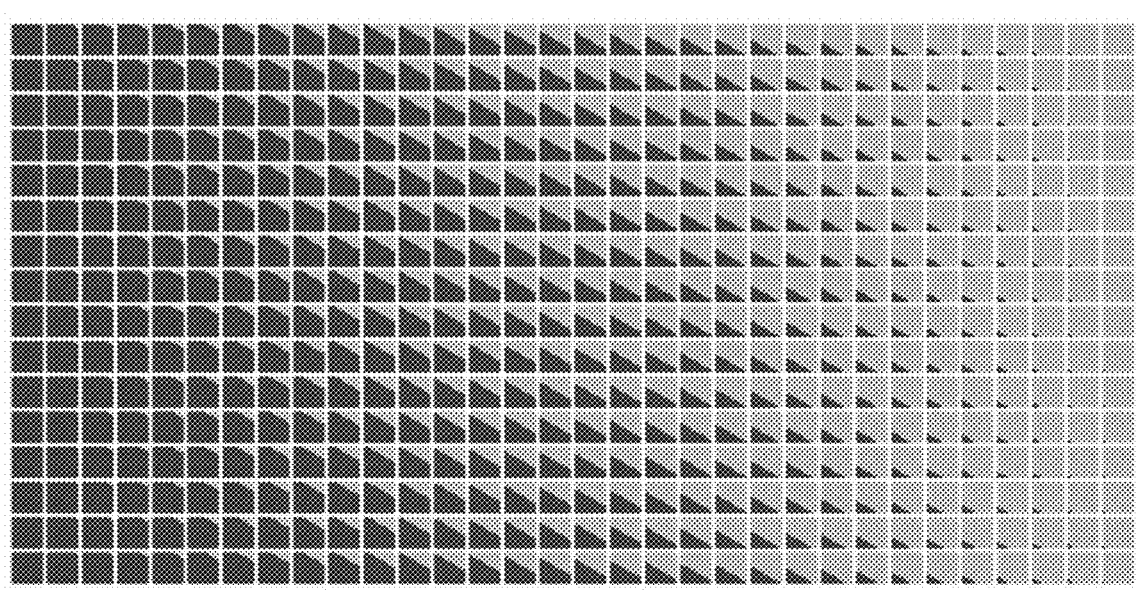
FIG. 1B illustrates an example color map.
Figure 1C:
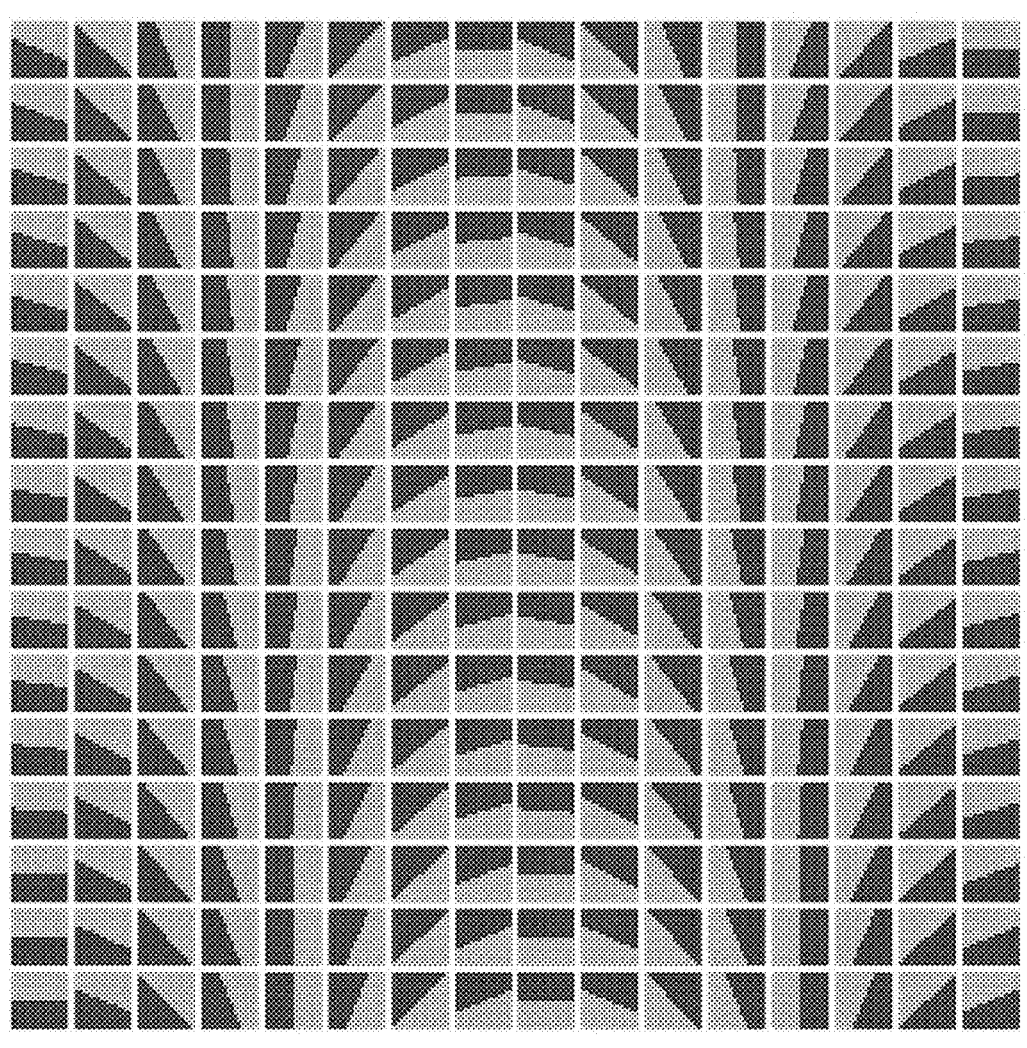
FIG. 1C illustrates an example color map.
Figure 1D:
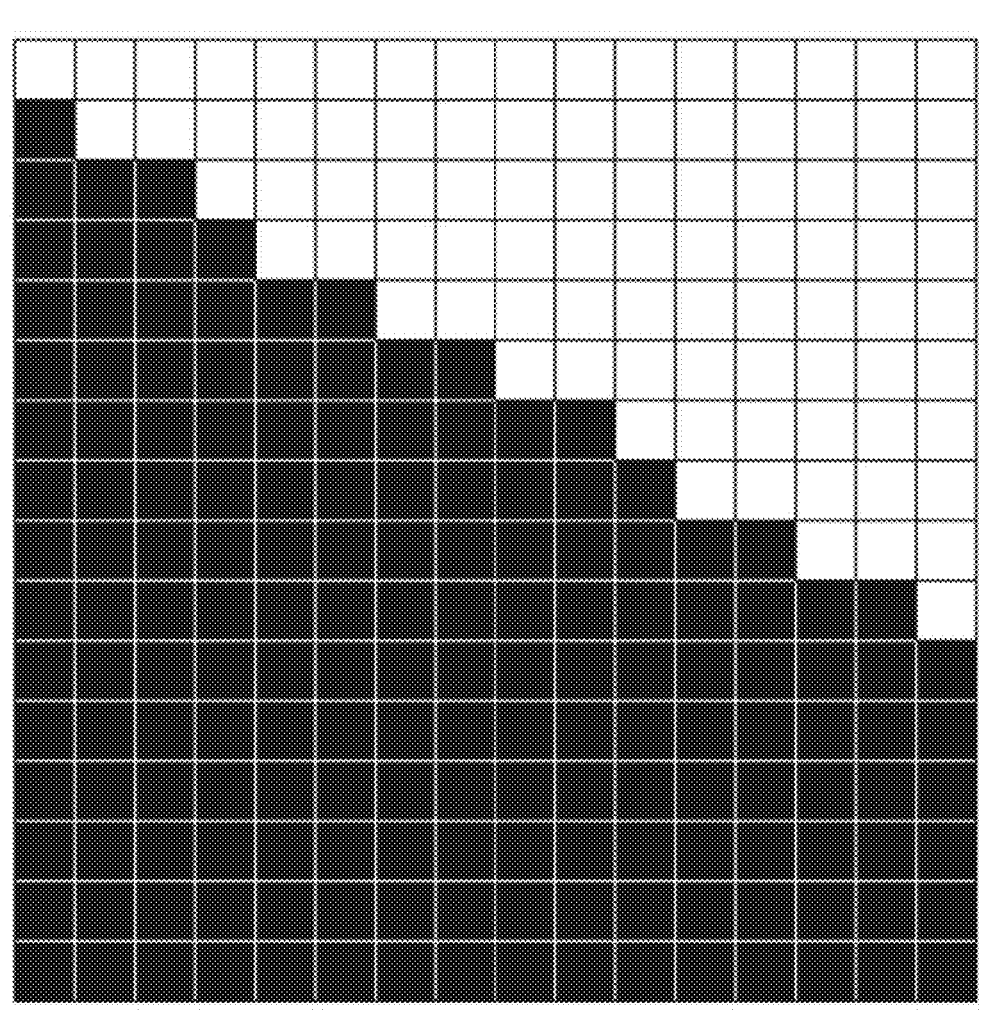
FIG. 1D illustrates an example color map.
Figure 1E:
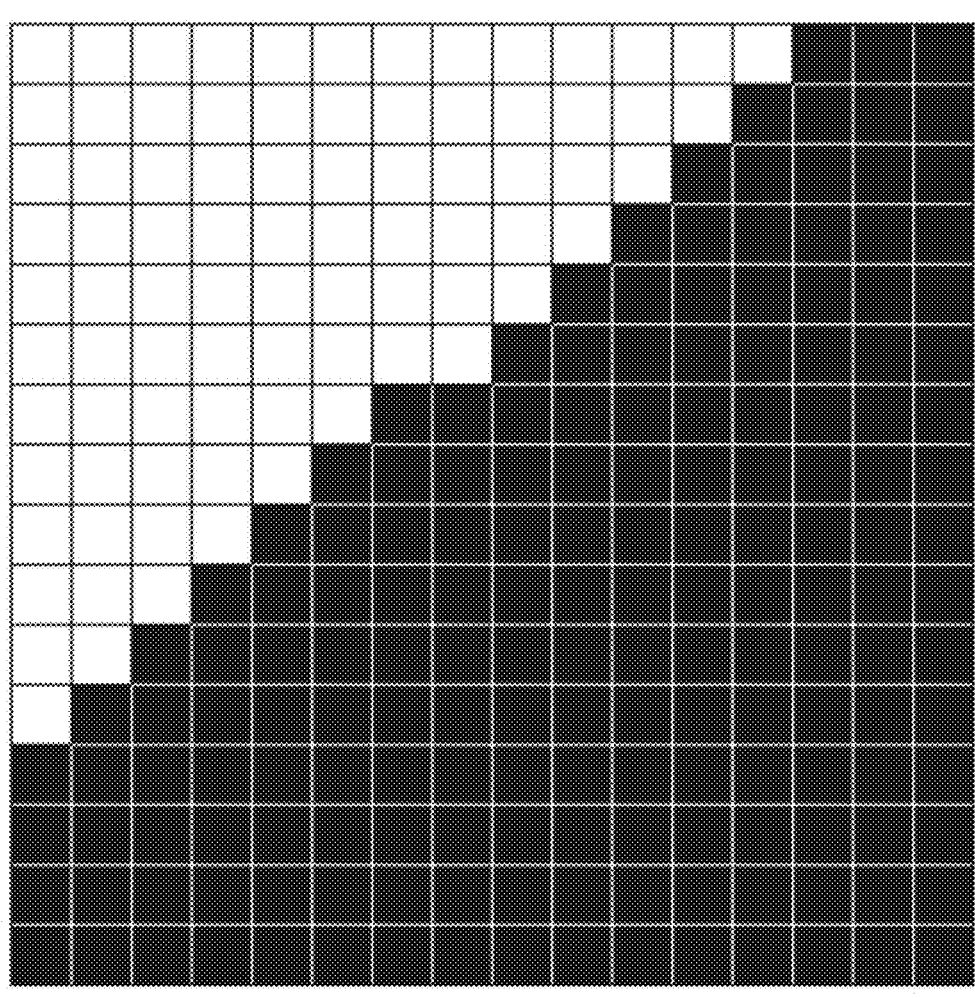
FIG. 1E illustrates an example color map.
Figure 1F:
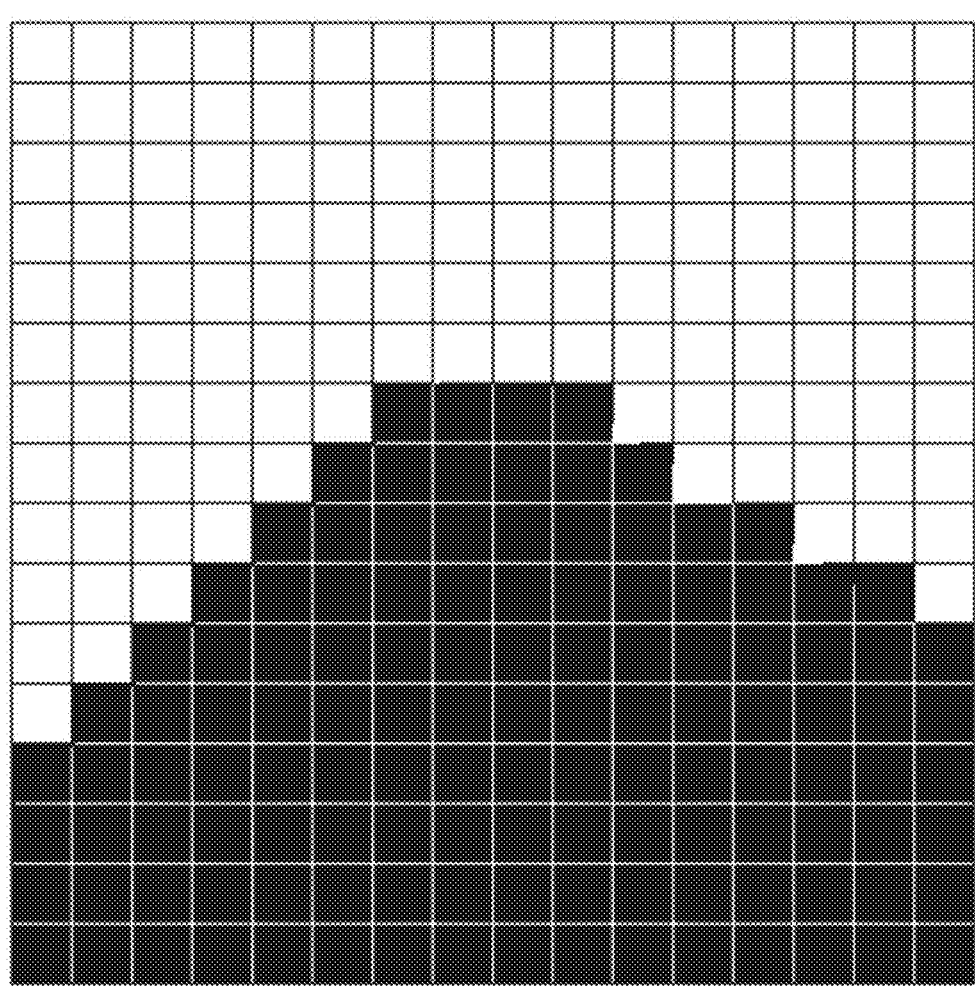
FIG. 1F illustrates an example color map.

FIG. 1A illustrates an example system for implementing a method for high-quality renderings of synthetic views of custom products, according to some embodiments. FIG. 1A, the other drawing figures, and all of the descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

The depicted example is provided for illustrative purposes. It should be noted that other implementations may include different configurations of the components than those shown in FIG. 1A.

In the depicted example, a product synthetic view rendering platform 101 comprises a product options module 102, a customized product 104, a rendering engine 106, a user interface 108, a product options selector 110, a synthetic view generator 112, a product data definitions 114, a product options engine 116, and a product options framework 120. Other implementations may include additional components not depicted in FIG. 1A. Yet other implementations may include fewer components than those depicted in FIG. 1A.

Product options module 102 may be configured to provide the functionalities for generating, modifying, and integrating product options to customize a product, which then can be sent to synthetic view generator 112 of product synthetic view rendering platform 101 for rendering. Product options module 102 may include a product options framework.

In some embodiments, product options framework 120 may be configured to provide the framework for handling the product options. It can also facilitate access to a bundling framework providing the logic to support processing attributes that are dependent on values of other attributes. The framework allows accounting for the fact that certain accessories may not fit a particular product. The framework may also allow compatibility to be determined both in terms of product manufacturing and capabilities of digital images of products to be visualized or rendered on display units.

In some embodiments, product options module 102 includes a bundling framework. The bundling framework comprises logic to support the accurate rendering of bundled products by determining which views of combined products are valid or should be shown in a graphical user interface or other displays. In general, when products are added to a bundle, the bundling logic is configured to examine each product, filter each product based on filters as previously described, and select and order one or more generated views based on matches of the filters.

Customized product 104 may be configured to store customized product data in product synthetic view rendering platform 101. For example, customized product 104 may capture data representing the customization options selected by a user as the user customizes the product using the synthetic product view rendering platform 101 and the choices that the user makes as the user navigates through the product customization options.

Rendering engine 106 may be configured to execute a rendering logic. The rendering logic may be configured to accommodate product options and bundles. In an embodiment, the rendering logic supports defining rendering files and adding elements to the rendering logic using declarative statements rather than pure programming. Attributes of views may be declared in rendering files that serve as configuration files to drive rendering processes. In an embodiment, the capabilities of the rendering logic are matched to the bundles of products through other declaratory statements and the matching syntax that are described later.

User interface 108 may be configured to facilitate interactions between rendering platform 101 and users. In an embodiment, a product bundle is defined as an association of two or more products that can be visualized together in a graphical user interface and are compatible or can be ordered together for use together or in a combined custom-manufactured product.

Product options selector 110 may be configured to provide the functionalities for tracking the options selected by users as the users navigate via the user interface driven by the application executing on product synthetic view rendering platform 101.

Synthetic view generator 112 may be configured to provide the functionalities for implementing a system and method for high-quality rendering of the synthetic view of the custom product presented herein.

Product data definitions 114 may be configured to store and provide definitions of products and various customization options for the products. Product data definitions may be processed using an attribute engine and key-value pairs, described later.

Product options engine 116 may be configured to provide the functionalities for managing various options and option configurations for the product offered to the users.

3.0 Synthetic View Rendering Requirements

In some embodiments, a product customization process permits a user to customize a product using functionalities available via a user interface. The interface may be implemented to generate and display one or more web pages on a user display device. The user interface may be configured to, for example, allow the user to interactively apply colors, tiled images, and photographic or designed images (e.g., user-designed images) to a two-dimensional pattern piece that comprises the product, as described below in more detail.

3.1 Requirements

Data generated by the user interface may include user account data, a product description (that describes the user's custom product), user image designs (that contains the user content), color choices (the colors chosen by the user), material choices (the type of materials for the custom product), and the finishing choices (the finishing selected by the user for the custom product). Based on that information, the user interface may assemble a set of instructions that describe the user design and request images of the final product from, for example, a user product renderer. The resulting interaction may be performed in real-time.

In some embodiments, rendering synthetic views of one-of-a-kind products in response to user actions has a unique set of requirements. The requirements are typically separate from the real-time or production media rendering. Examples of the requirements include the following requirements:

1. Each individual request may require new assets, so caching of textures on graphics hardware may be associated with a high latency cost.
2. Each request breaks frame-to-frame coherence strategies for optimizing rendering.
3. Each custom product has different graphic characteristics, making the special case rendering and tuning used in games and simulations less effective.
4. Requirements for rendering time or pipe latency are based on product browsing timing rather than proving a smooth frame rate or optimizing rendering for a movie frame. Typically, the rendering time for a product view may be greater than the $\frac{1}{60}$ sec render time for a simulation and much less than the 20-minute render time typical for a frame of a feature film. Acceptable latencies may range from $\frac{1}{15}$ sec to $\frac{1}{2}$ sec.
5. Image quality is expected to be high since the image depiction directly impacts the user's perception of the custom product.
6. Rendering with a high-quality sub-pixel sampling is needed to resolve the complex product geometry and transparencies. In some embodiments, the system and method described herein solve the requirements issues for high-quality rendering at least for the last group of requirements, i.e., for the high-quality sub-pixel rendering requirement. The solution allows for resolving the complex product geometry and transparencies. The solution provides, among other things, a novel method for sampling sub-pixel geometry.

The presented system and method overcome the limitations of the low-level rendering portions of the prior art, which tend to use implicit surface detection (as in Embree approach), explicit subdivision into pixel buckets (as in Reyes approach), and explicit scan conversion of geometry (as in Catmull '78 approach).

Embree is a kernel framework for efficient ray tracing on x86 CPUs. Embree is directed to professional rendering environments in which scenes with high geometric complexity and indirect illumination are the norm rather than the exception. To address this, Embree provides a set of commonly used kernels optimized for different ISA vector widths, workloads (e.g., coherent and incoherent ray distributions, static and dynamic scenes), and application-specific priorities (e.g., maximal performance or minimal memory usage). Renderers built on these kernels can achieve a bounding volume hierarchy (BVH) build and ray traversal performance comparable to existing methods on many CPUs or GPUs.

Reyes is an image rendering system developed at Lucasfilm Ltd. and currently used at Pixar. Reyes provides an architecture optimized for fast, high-quality rendering of complex animated scenes, i.e., to compute a feature-length film in approximately a year. It provides high-quality means virtually indistinguishable from live action motion picture photography and complex means as visually rich as real scenes.

As in Catmull, the explicit scan conversion of geometry implements a hidden-surface algorithm with anti-aliasing. The aliasing problems usually include jagged edges, small objects popping on and off the screen in successive frames, moiré patterns in rendering periodic images, fine detail breaking up, etc. The problem occurs mainly because the image space is sampled at discrete points corresponding to the pixels. Catmull's hidden surface algorithm includes, among other things, sorting all polygons on the highest "y" value, initializing an active polygon list to be empty, and repeating for each scanline: adding polygons from the y-list that enter this scanline to active polygon list, initializing the x-bucket to be empty the scanline array to background, and looping through each polygon in an active polygon list by performing specific clipping, replacing, and sorting operations on the polygons.

In some embodiments, the presented system and method overcome the limitations of the techniques for handling sub-pixel transparency or anti-aliasing, including accumulated jittered random sampling, accumulating micro-polygons, or using a modified Reyes to store transparency and color data in an A-Buffer.

A-buffer (i.e., anti-aliased, area-averaged, accumulation buffer) is a general hidden surface mechanism suited to medium-scale virtual memory computers. It resolves visibility among an arbitrary collection of opaque, transparent, and intersecting objects. Using an easy-to-compute Fourier window increases the effective image resolution many times over the Z-buffer with a moderate increase in cost.

In some embodiments, the presented system and method overcome the limitations of other methods concerning the availability of computer memory by utilizing, for example, the A-Buffer algorithms to store coverage data.

In some embodiments, the system and method described herein use a hybrid approach, which explicitly relies on scan converting but implicitly relies on deriving sub-pixel coverage using modern scalar instructions and a carefully constructed coverage data set to perform the implicit calculations.

3.2 Capture Buffer Approach

In some embodiments, a capture buffer approach is based on the design and function of a coverage mapping. It uses a Scalar Instruction Set in computing hardware to quickly determine sub-pixel coverage, overlapping, and shading contributions to a single pixel.

Some of the key points of novelty of the coverage-mapping include using a single 256-bit Scalar Instruction register in a microprocessor to hold a 16×16 pixel bitmap to hold the coverage of a pixel by a vector-based triangle.

Another key point is using a look-up table of the 256-bit maps organized to be quickly selected and loaded based on two 128-bit Scalar Instruction registers. One may represent a side of a triangle, and the other represents the pixel target. Each register may be carefully designed to provide the selection in a few clock cycles in the most common cases. The side of a triangle may be represented as a vector scalar of dimension 4 where the first two components are the normalized x, y direction of the edge, and the third component is the distance of the x y normal from 0, 0. The fourth component is the angular look-up of the edge where 0 . . . 360 degrees are represented as 0 . . . 256 integers (i.e., angleIndex).

The pixel of the component may be represented as a vector scalar of dimension of 4 where the first two components are the x y location of the center of the pixel. The third component is 1.0, and the fourth component is 0.

4.0 Synthetic View Rendering Process

FIG. 2 illustrates an example processing flow for rendering synthetic views, according to some embodiments. The steps described in FIG. 2 may be performed using the components of the synthetic product view rendering platform 101, described in FIG. 1.

4.1 Generating Calibrated Product Renderings Assets

In step 202, the process of generating a synthetic view rendering begins by generating calibrated product rendering assets. The calibrated product rendering assets may be generated by creating a digital representation of a referenced physical product. A referenced physical product may be produced using designated colors and patterns. The colors and patterns may be generally referred to as "markups."

A markup is recognized and used to construct geometry, design areas, masks, local surface shading, and global luminance shading. The geometry, luminance maps, and color maps are usually tied to product options key-values.

4.2 Applying User-Driven Settings of Product Option Key-Values to Calibrated Product Rendering Assets In step 202A, as part of generating the calibrated product rendering assets, user-driven settings of product option key-values are applied to the calibrated product rendering assets. This may include setting a substrate, trim, or other key-values associated with color or textural appearance. A substrate may be the material from which the product is made. For example, the substrate for a poster is paper, the substrate for a t-shirt is cotton cloth, the substrate for a phone case may be polycarbonate, and so forth. In some embodiments, texture assets and color maps may be set by reference.

In some embodiments, applying the product option key-values also includes setting design areas associated with key-value. This may include setting design area references by, for instance, setting an image to render into a design U-V geometry specified by a markup.

In some embodiments, applying the product option key-values also includes setting product parametric key-values. This may include transforming the geometry features and placements. The keys for a particular product may include a product height, a product width, a product depth, and a product circumference, a placement of designs, a design height, a design width, and the like.

In some embodiments, trim geometry features and placements are transformed. The transformation may include fitting the framing or edging to the geometry features and setting physical profiles of framing or edging.

In some embodiments, view parameters are set. This may include setting geometry transforms to a specific view. This may also include setting in-situ transforms.

4.3 Initiating the Rendering Application

In step 202B, a rendering application is initiated. In this step, a CoverageMap service is initialized. The Coverage-Map service is described later.

4.4 Rendering the Assets

In step 208, the assets are rendered. In this step, a Coverage buffer service is initialized. The Coverage buffer service is described later.

Then, the following is performed for each surface in the calibrated product rendering asset: in step 208A, the surface appearance assets are bound to the corresponding colors, textures, designs, parametric shading, and the like.

Then, in step 208B, a hybrid scanline and implicit structure are built for each polygon in the calibrated product rendering asset. This may include determining triangle points, triangle deltas, and ImplicitTriangles.

In step 208C, the converted surfaces are scanned into explicit pixel samples, and the pixel samples are implicitly evaluated into a CoverageMap.

In some embodiments, each triangle is scan-converted by performing the following: for each X Y pixel in the scan, the ImplicitTriangle is evaluated using the CoverageMap Service. If the X Y pixel is fully inside the polygon, then a default full CoverageMap is set. However, if the X Y pixel is partially inside the polygon, then a CoverageMap is calculated. Then, the pixel is set in the Coverage buffer. If the pixel is visible, then the pixel is shaded.

In step 208D, the Coverage buffer is converted to a final image. This is described in detail later.

4.5 Displaying the Assets

Figure 3:
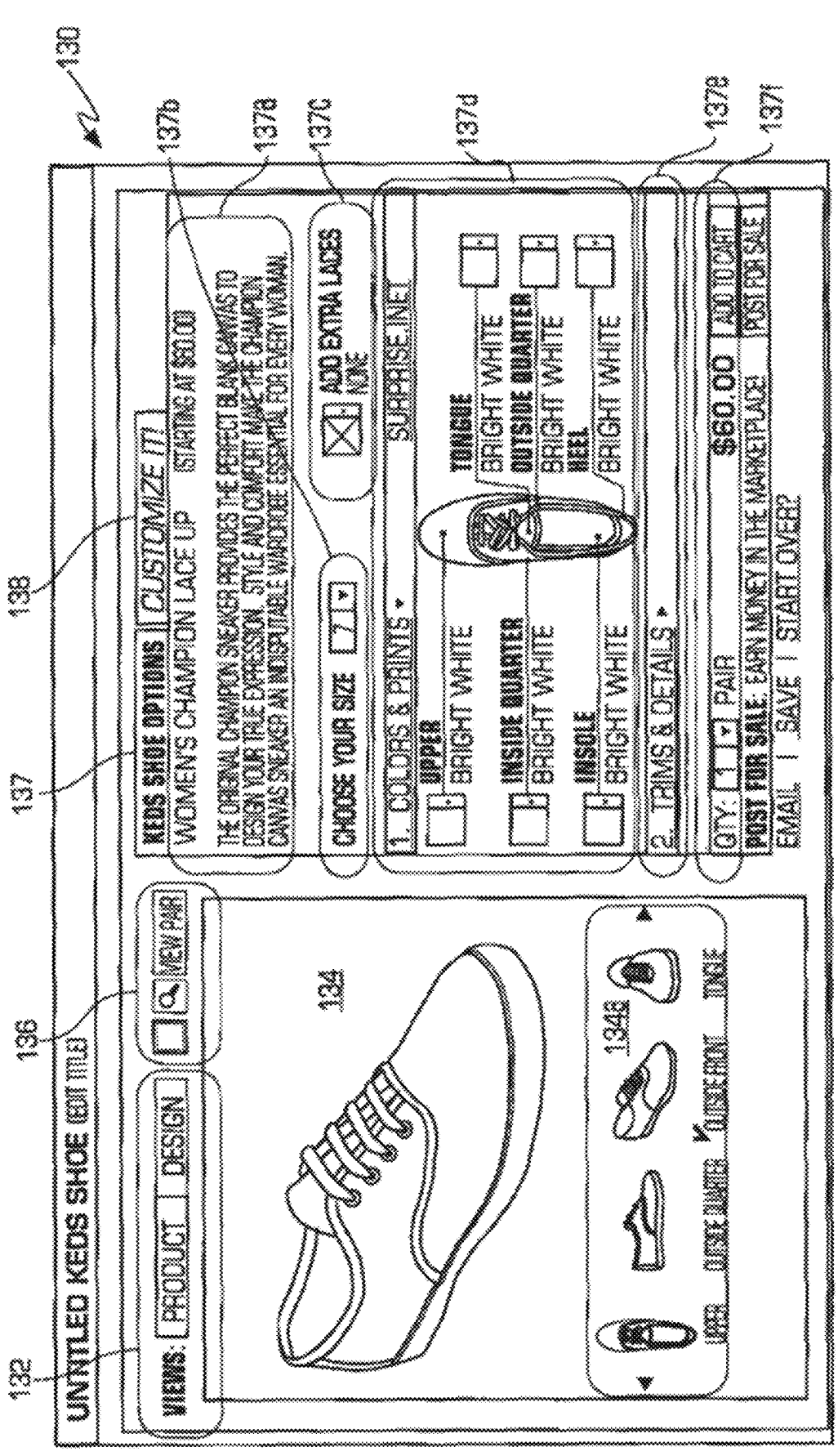
FIG. 3 illustrates an example of a user interface of a product customization system, according to some embodiments.

FIG. 3 illustrates an example of a user interface 130 of the product customization system, according to some embodiments. The depicted example shows a rendered image 134, corresponding to a rendered image 134 shown in FIG. 2 of U.S. Pat. No. 8,175,931 B2.

The user interface may include a view option portion 132 that allows the user/consumer to select between a product view and a design view in a view portion 134. The view portion also has a view selector 134a that allows the user/consumer to select among the views (upper, outside quarter, outside front, or tongue, for example) to be displayed in the view portion. The user interface may also include a view tools portion 136 that allows the user to replace or delete a portion of the view (dotted box tool), zoom the view (the magnifying glass tool), and/or view the pair of products together in the view portion.

The user interface further comprises a product options tab 137 (a Keds Shoe option tab because the product in the example is a Keds shoe) that allows the user to select various product options (such as colors and patterns for the design area and accessories) and a customize it a tab 138 that allows the user to customize the product with user content as described below in more detail. As shown, the product options tab (herein the product is a shoe) may further include a product summary portion 137*a* that displays a summary of the particular product, a size portion 137*b* that allows the user to select the appropriate size of the product, an extra laces portion 137*c* that allows the user to select extra laces to be purchased with the customized product, a color and prints portion 137*d* that allows the user to select a color and/or print for each piece of the product (such as the upper, tongue, inside quarter, insole, heel and outside quarter in the shoe example), a trims and detail user interface 137*e* that allows the user to select certain trims and details for the product and a commerce portion 137*f* that allows the user to select a quantity of products to purchase, shows the accumulated price of the products and allows the user to add the customized products to an electronic shopping cart.

5.0 Coverage Map 5.1 Coverage Map Service

One of the problems in computer graphics is rendering high-quality scenes, which is often time-consuming, especially in overlapping cases.

There are many different ways of handling the overlapping objects. Suppose there is a pixel that needs rendering in a final render where there is a partial polygon for one thing and in other polygons for some other things. The rendering in this case requires taking into account how the edge of each polygon covers the pixel, and how other polygons are overlapping along the edges.

The coverage mapping approach is based on adding up the polygons, adding up the pixels, adding up 16 pixels for final pixels, and so forth. In that approach, there are 256-bit operators, and the 256-bit operators can be used in different ways.

One of the ways they can be used is in Boolean operations, where a 256-bit operator can represent a 16 by 16 array. For a given pixel for a given Polygon, a bit can be turned on for every place in that pixel where a Polygon edge is present.

A coverage map is a Boolean map that is 16 by 16 of a subpixel area. Hence, an edge of a Polygon is covered with pixels. Then, a coverage map for each pixel is determined for that given edge.

5.2 Coverage-Mapping

The design and function of Coverage-Mapping is to use the Scalar Instruction Set in computing hardware to quickly determine sub-pixel coverage, overlapping, and shading contributions to a single pixel.

Some of the key points of novelty of the coverage-mapping include using a single 256-bit Scalar Instruction register in a microprocessor to hold a 16×16 pixel bitmap to hold the coverage of a pixel by a vector-based triangle.

Another key point is using a look-up table of these 256-bit maps organized to be quickly selected and loaded based on two 128-bit Scalar Instruction registers, one representing a side of a triangle and the other representing the pixel target. Each register may be carefully designed to provide the selection in a few clock cycles in the most common cases, as in FIG. 1B.

The side of a triangle may be represented as a vector scalar of dimension 4 where the first two components are the normalized x, y direction of the edge, the third component is the distance of the x y normal from 0, 0. The fourth component is the angular look-up of the edge where 0 . . . 360 degrees are represented as 0 . . . 256 integers (i.e., angleIndex).

The pixel of the component is represented as a vector scalar of dimension 4, where the first two components are the x, y location of the center of the pixel. The third component is 1.0, and the fourth component is 0, as in FIG. 1C.

The look-up table of these 256-bit maps is pre-calculated where the full range of offsets in pixel coordinates covers the hypotenuse of the pixel, this being the square root of 2 (sqrt2). Half of this range is sqrt2*0.5 (halfSqrt2). The full range of offsets in look-up indices is 512. The offset distance of an edge from the center of the sub-pixel may range from minus halfSqrt2 to halfSqrt2; this is the pixelDistance. The offsetIndex is calculated as the integer value of ((pixelDistance+halfSqrt2)*512)/sqrt2. Rows of an angleIndex from 0 . . . 256 are rendered as columns of the offsetIndex from 0 . . . 512. See FIGS. 1D, 1E, and 1F.

Boolean area operations on maps may be performed very quickly. For Example, the intersection of two of these 256-bit maps may be performed by a single Scalar Instruction and operation the maps, returning the resulting map in a processor clock cycle. The union of two of these 256-bit maps may be performed by a single Scalar Instruction or operation the maps, returning the resulting map in a processor clock cycle. The difference of two of these 256-bit maps may be performed by a single Scalar Instruction AndNot operation the maps, returning the resulting map in a processor clock cycle.

A 256 bit coverage map (triangleCoverage) may be selected quickly using Scalar Instruct Hardware. For example, given a pixel128 scalar and three edge128 scalars, for each edge, a dotProduct Scalar Instruction (1 processor cycle) returns the distance (Dn) of the edge from the center of the pixel. If Dn is less than minus halfSqrt2 the edge is outside the pixel, and the entire triangle may be rejected for coverage processing. If Dn is greater than halfSqrt2, the sub pixel is full coverage, and processing for the other edges continues. The offsetIndex for the edge is determined from Dn where an offsetIndex=(integer)(Dn+halfSqrt2)*(512/ sqrt2)). The coverage 256-bit map is loaded from the look-up where a coverageMap=lookup [edge[3]], [offsetIndex]. The triangleCoverage is accumulated by intersecting coverageMap with the previous edge's map.

The contribution of a coverageMap to a pixel may be found by computing contributionScale=populationCount (coverageMap)/256, where populationCount is the pop-Count scalar instruction that returns the number of bits set to 1 in the 256 bit scalar.

The contribution of one coverageMap under another may be found by computing the contributionMap=difference (coverageMap2, coverageMap1); contributionScale=populationCount(contributionMap)/256, where the populationCount is the popCount scalar instruction that returns the number of bits set to 1 in the 256 bit scalar.

An example of a pseudo-code for one implementation of the CoverageMap is provided below:

```
/**
 * CoverageMap
 * A structure to hold a 16x16 binary coverage map.
 * It will return the area of the map, and perform
 * Boolean operations on it.
 */
```

-continued

```
struct ___align___(32) CoverageMap
{
public:
    union {
        ___m256i coverage;
        struct { uint64 a, b, c, d; };
    };
    embree::Vector4f centroid;
    ___forceinline CoverageMap( ) { }
    ___forceinline ~CoverageMap( ) { }
    ___forceinline CoverageMap(uint64 n)
    {
        coverage = __mm256_set1_epi64x(n);
    }
    ___forceinline CoverageMap(const CoverageMap & q)
    {
        coverage = q.coverage;
        centroid = q.centroid;
    }
    /**
    * Returns the area this map covers of a single pixel.
    * @returns the area of coverage 0...255.
    */
    static ___forceinline int32 area(___m256i & map)
    {
        uint64 n = __mm_popcnt_u64(map.m256i_u64[0]);
        n += __mm_popcnt_u64(map.m256i_u64[1]);
        n += __mm_popcnt_u64(map.m256i_u64[2]);
        n += __mm_popcnt_u64(map.m256i_u64[3]);
        return((int32)n);
    }
    /**
    * Returns the area this map covers of a single pixel.
    * @returns the area of coverage 0...255.
    */
    ___forceinline int32 area( )
    {
        uint64 n = __mm_popcnt_u64(a);
        n += __mm_popcnt_u64(b);
        n += __mm_popcnt_u64(c);
        n += __mm_popcnt_u64(d);
        return((int32)n);
    }
    /**
    * Clears the map
    */
    ___forceinline void clear( )
    {
        a = 0;
        b = 0;
        c = 0;
        d = 0;
        centroid = embree::Vector4f(0.0f);
    }
    /**
    * Intersects this map with another map
    * @param The map to intersect this map with.
    */
    ___forceinline void intersect(CoverageMap & q)
    {
        coverage = __mm256_and_si256(coverage, q.coverage);
    }
    /**
    * Unions this map with another map
    * @param The map to combine this map with.
    */
    ___forceinline void combine(CoverageMap & q)
    {
        coverage = __mm256_or_si256(coverage, q.coverage);
    }
    /**
    * Subtracts another map from this map.
    * @param The map to subtract from this map.
    */
    ___forceinline void difference(CoverageMap & q)
    {
        coverage = __mm256_andnot_si256(q.coverage, coverage);
    }
    /**
```

-continued

```
    * returns the centroid for this map
    * @param The returned centroid for this map
    */
    ___forceinline void getCentroid(embree::Vec2f & n)
    {
        n.x = centroid.x;
        n.y = centroid.y;
    }
};
```

Note that the Boolean area operations on the Coverage-Map, intersect, combine, and difference are performed by a single scalar instruction taking a single clock cycle. This allows for very fast calculations of sub-pixel rendered regions. Note also that the area may be computed using scalar instruction popcnt( ) operations, which allows for the fast conversion of a coverage area into an opacity.

The number of possible edges in a 16×16 sub pixel array is relatively small. In one embodiment, an array of all possible edges may be represented by 256 angles and 512 subpixel distances from the upper left corner of the array. In one embodiment the pixel distance for distance are sqrt (2.0)/512.0, and the angular units are (2.0*PI( )/256.0.

An example of a pseudo-code for one implementation of building this array (using embree::math.h for intrinsics) is provided below:

```
/**
* Builds the look-up table to map angles and distance to coverage.
*/
void buildCoverageMapLook( )
{
    mapLook.resize(512 * 256);// fixed size of coverage map look-up
    int32 mapDex = 0;
    for (int32 i = 0; i < 256; i++)
    {
        float angle = (float)i * ((float)embree::TwoPiTy( ) / 256.0f);
        for (int32 j = 0; j < 512; j++)
        {
            float d = (float)j * (gSqrtTwo / 512.0f);
            d = d – gHalfSqrtTwo;
            embree::Vector4f edge = embree::Vector4f(embree::cos(angle),
embree::sin(angle), d, 0.0f);
            CoverageMap map;
            double accumX = 0.0;
            double accumY = 0.0;
            double accumCount = 0;
            for (int32 ii = 0; ii < 16; ii++)
            {
                float y = ii * (1.0f / 15.0f) – 0.5f;
                uint16 scanLine = 0;
                for (int32 jj = 0; jj < 16; jj++)
                {
                    float x = jj * (1.0f / 15.0f) – 0.5f;
                    embree::Vector4f sample = embree::Vector4f(x, y, 1.0,
0.0f);
                    float nd = embree::dot(edge, sample);
                    if (nd < 0)
                    {
                        accumX += x;
                        accumY += y;
                        accumCount += 1.0;
                        scanLine |= 1 << jj;
                    }
                }
                map.m256.coverage__u16[ii] = scanLine;
            }
            if (accumCount > 0)
            {
                accumX = accumX / accumCount;
                accumY = accumY / accumCount;
            }
            map.centroid = embree::Vector4f((float)accumX, (float)accumY,
```

-continued

```
0.0f, (float)(accumCount));
        mapLook[mapDex] = map;
        mapDex++;
      }
    }
}
```

A pixel coordinate may also be represented by a _m128 register. It may be converted so that a dot product with the edge structure may produce a distance from the edge if the pixel is in the form x, y, 1, 1.

It is useful to quickly prepare a given integer X, Y pixel for evaluation against an edge.

An example of a pseudo code for a possible implementation for this conversion is described below:

```
/**
* Builds a pixelCoord for calculating pixel coverage.
```

-continued

```
* @param the pixel's x location
* @param the pixel's y location
* @returns a Vector4f of the pixel coordinate to perform coverage
calculations.
*/
static ___forceinline embree::Vector4f pixelCoord(int32 x, int32 y)
{
    ___m128i origin =_mm_set_epi32(1, 1, y, x); // note set is in order(3,
2, 1, 0)
    embree::Vector4f coord = _mm_cvtepi32_ps(origin); // fast convert to
float
    coord += embree::Vector4f(0.5f, 0.5f, 0, 0); // round
    return(coord);
}
```

Now the converted pixel may be implicitly evaluated by the edge quickly with a dot product. This can be done in 1.5 clock cycles using the _mm_dp_ps( ) intrinsic function.

An example of a pseudo-code for a possible implementation of evaluating the pixel and returning a CoverageMap is included below:

```
#pragma once
  /**
  * Builds a coverageEdge as an embree::Vector4f for calculating pixel coverage.
  * @param the edge's x origin
  * @param the edge's y origin
  * @param the edge's x endpoint
  * @param the edge's y endpoint
  * @returns a Vector4f to perform coverage calculations.
      */
  static ___forceinline embree::Vector4f coverageEdge(float x0, float y0, float x1,
float y1)
    {
      embree::Vector4f origin(x0, y0, 0, 0);      //normal is x, y direction of edge
      embree::Vector4f normal(-(y1 - y0), x1 - x0, 0, 0);
      normal = embree::normalize(normal);           // normal is magnitude 1.0
      normal[2] = -embree::dot(normal, origin);       //normal[2] is distance from 0, 0
      {
        float angle = atan2_a(normal.y, normal.x);
        if (angle < 0)
        {
          angle += (float)embree::TwoPiTy( );
        }
        angle = angle * (256.0f / (float)embree::TwoPiTy( ));
        normal[3] = floorf(angle);        //normal[3] is angle look-up.
      }
      return(normal);
    }
  /**
  * Builds a pixelCoord for calculating pixel coverage.
  * @param the pixel's x location
  * @param the pixel's y location
  * @returns a Vector4f of the pixel coordinate to perform coverage calculations.
  */
  static ___forceinline embree::Vector4f pixelCoord(int32 x, int32 y)
    {
      ___m128i origin = _mm_set_epi32(0, 1, y, x);   // pixelCoord is x, y, 1.0, 0.0
      embree::Vector4f coord = _mm_cvtepi32_ps(origin);
      coord += embree::Vector4f(0.5f, 0.5f, 0, 0);
      return(coord);
    }
  /**
  * Makes a coverage map for an edge and a pixel.
  * @param the edgeAngle
  * @param the pixelCoord
  * @param the found CoverageMap
  * @param the found centroid
  * @returns the index of the found coverageMap.
  */
  ___forceinline int32 coverageMap(
    embree::Vector4f& edge,
    embree::Vector4f& pixel,
    CoverageMap& map)
    {
      float d = embree::dot(edge, pixel);
```

-continued

```
if (d <= −gHalfSqrtTwo)
{
  map = CoverageMap(0xffffffffffffffff);
  map.v = embree::Vector4f(0, 0, 0, 256.0f);
  return(0);      // full coverage
}
if (d>= gHalfSqrtTwo)
{
  map = CoverageMap(0);
  map.v = embree::Vector4f(0.0f);
  return(511);      // no coverage
}
CoverageMap map0;
CoverageMap map1;
embree::Vec2f centroid0;
embree::Vec2f centroid1;
  _coverageMap(d0, edge0, pixel, map0);
  _coverageMap(d1, edge1, pixel, map1);
  return(intersectMaps(map0, map1, map));   // partial coverage
}
```

It is worth noting that most pixel evaluations may be fully within the edge or outside it, so the fast evaluation using the intrinsic scalar dot product instruction may be applied. The evaluation of an ImplicitTriangle may be optimized by performing three dot-product edge evaluations for a quick accept/reject.

The core of the presented approach is a CoverageMap service. The CoverageMap service evaluates an ImplicitTriangle and provides a coverage map for, for example, a 16×16 sub-pixel area. The CoverageMap service may be implemented in many ways. Below is an example of one possible implementation of the CoverageMap Service. It should be noted that this embodiment is tuned to a specific scalar instruction set so that other instruction sets may require separate embodiments.

In some embodiments, a CoverageMap structure is designed to represent a single edge of a polygon and to evaluate the 16×16 binary coverage of that edge for any X, Y pixel. The structure may contain:

1. coverage, a 256-bit vector containing the 16×16 coverage map, and
2. centroid, a 128-bit vector containing 4 single precision floating point values containing the sampling point for the CoverageMap that corresponds to a coverage area.

The CoverageMap service may evaluate an X, Y pixel against a single edge; an edge may represent the edge, a 128-bit vector containing 4 single precision floating point values describing the edge holding a, b, c, d, where a, b is the normal of a 2d edge, c is the offset from the normal to 0, 0 for the edge, and d is the distance from the upper left corner of a pixel to its center.

In one implementation, the CoverageMap service is represented by an Intel _m256i register defined in the AVX2 instruction set (see imminitrin.h Meta Header file for Intel® Architecture intrinsic functions).

In one implementation, the centroid is represented by an Intel _m128 register referenced in the SSE4.1 instruction set (see smmintrin.h, Meta Header file for Intel® Architecture intrinsic functions).

In one implementation, an edge is represented by an Intel _m128 register referenced in the SSE4.1 instruction set (see smmintrin.h, Meta Header file for Intel® Architecture intrinsic functions).

6.0 The Coverage Buffer Service

Once the scan converted pixel for a triangle is positively evaluated, a CoverageMap may be added to the Coverage buffer.

In one implementation, the Coverage buffer is a 2D array of 32-bit integers that are the start of an indexed list of CoverPix structures. On initialization, the array is set to the size of the image to be rendered, and its values are set to −1 to indicate that they are empty.

A CoverPix is an intermediate representation of a shaded pixel that holds shading and surface data, an index to a CoverageMap, a SurfaceID, and compositing information.

An example of pseudo code for a possible implementation of a CoverPix is shown below:

```
struct CoverPix
{
  /**
   * CompositeOp declaration.
   * @param The CoverPixel atop the dest.
   * @param The pixel beneath the CoverPixel.
   */
  typedef float (*CompositeOp)(CoverPix& top, embree::Vector4f &dest);
  embree::Vector4f color;      // the shaded color of this pixel
  CompositeOp compositeOp;   // the compositing operation to apply this pixel
  float depth;                // the depth for this pixel
  float coverage;           // the coverage of this pixel
  int32 next;            // the next pixel in z order
  int32 mapDex;          // the coverage mapping array index
  uint64 surfId;;         // the surface ID for this pixel
  ___forceinline CoverPix( )      // Nothing set here for speed. Use Coverage
buffer::set( ) to allocate.
  ___forceinline ~CoverPix( ) { }
```

-continued

```
___forceinline CoverPix(const CoverPix& a)
{
    color = a.color;
    depth = a.depth;
    compositeOp = a.compositeOp;
    mapDex = a.mapDex;
    coverage = a.coverage;
    next = a.next;
    surfId = a.surfId;
  }
}
```

In some embodiments, the Coverage buffer holds a resizable array of CoverPix and CoverageMaps. When a shaded pixel is added to the Coverage buffer, a CoverPix and CoverageMap are allocated for them (if needed) and they are placed into a z-ordered linked list in the Coverage buffer.

An example of pseudo code of a possible implementation of the Coverage buffer structure is shown below:

```
struct Coverage buffer
{
    typedef std::vector<CoverPix> PixList;
    typedef std::vector<CoverageMap> MapList;
    std::vector<PixList> pixLists;
    std::vector<MapList> mapLists;
    cv::Mat coverBuff;
    Coverage buffer( ) { }
    ~Coverage buffer( ) {}
    Coverage buffer(const Coverage buffer& a)
    {
        pixLists = a.pixLists;
        mapLists = a.mapLists;
        coverBuff = a.coverBuff;
    }
    Coverage buffer(int32 width, int32 height)
    {
        build(width, height);
    }
    /**
    * Builds the Coverage buffer, allocating coverBuff, pixes, and maps.
    * @param The width of the rendering area.
    * @param The height of the rendering area.
    */
    void build(int32 width, int32 height)
    {
        coverBuff = cv::Mat(height, width, CV__32SC1);
        coverBuff = −1;
```

-continued

```
        pixLists.resize(height);
        mapLists.resize(height);
        CoverageMap map(0xffffffffffffffff);
        map.v = embree::Vector4f(0, 0, 0, 256.0f);
        for (int32 i = 0; i < height; i++)
        {
            pixLists[i].reserve(width * 3);
            mapLists[i].reserve(width >> 1);
            mapLists[i].push__back(map);   //reserve full coverage mapping
array as index 0.
        }
    }
}
```

In this implementation, the CoverPix and CoverageMaps are allocated as arrays for each "x" scanline. This is to allow multithreaded rendering of the image by scanline areas. When a shaded scan-converted pixel is placed into the map, if it is determined that pixel of the Coverage buffer is empty, then it may just be allocated and set. If the new pixel falls behind another pixel in the map that is fully opaque, it may be ignored. If the new pixel has the same surfaceID and matches the "z" depth of a pixel in the Coverage buffer, then it may be combined into the existing CoverPix of that surface. If none of these are the case, then a new CoverPix is allocated, and its index is sorted into the linked list of CoverPix ids for its X, Y location.

Shading the pixel is the most expensive single operation, so it is performed only if the pixel will contribute to the rendering.

An example of pseudo code of an implementation of the Coverage buffer::set function, along with helper functions, is described below:

```
/**
* Pushes a map onto the mapLists.
* @param The map to push.
* @param The scanline index for the mapLists
* @returns The index for this scanline for the new map.
*/
___forceinline int32 pushMap(CoverageMap &map, int32 y)
{
    int32 mapDex = mapLists[y].size( );
    mapLists[y].push__back(map);
    return(mapDex);
}
/**
* Pushes a CoverPix onto the pixLists.
* @param The CoverPix to push.
* @param The scanline index for the pixLists
* @returns The index for this scanline for the new CoverPix.
*/
___forceinline int32 pushPix(CoverPix &pix, int32 y)
{
    int32 pixDex = pixLists[y].size( );
    pixLists[y].push__back(pix);
    return(pixDex);
```

-continued

```
    }
    /**
     * Sorts a pixel into the Coverage buffer
     * @param The source ScanShader
     * @param The ShadePoly context for setting the pixel.
     * @param the horizontal offset in pixels.
     * @param the vertical offset in pixels.
     * @param the compositing operation for the pixel
     */
    void set(RasterShader &shader, ShadePoly &context, int32 x, int32 y)
    {
        embree::Vector4f coord = CoverageMapping::pixelCoord(x, y);              // the
coord for CoverageMapping
        if (context.update(*gCoverage, coord))                      // update the poly
        {
            PixList& pixes = pixLists[y];
            MapList& maps = mapLists[y];
            int32* buff=(int32*)coverBuff.ptr(y, x);                 // the pixel is
within sub-pixel limits.
            embree::Vector4f cSample = context.centerSample(coord);
            float depth = cSample[2];
            if (buff[0] < 0)                         // if there is no CoverPix
set in the buffer...
            {
                shader.shadePixel(context);                     // shade the pixel.
                CoverPix pix;
                pix.color = context.pixel;
                pix.depth = depth;
                pix.setOp(shader.blendMode);
                pix.next = -1;
                pix.surfId = shader.id;
                if (context.cMap.v.w == 256)                     // if there is full
pixelcoverage...
                {
                    pix.mapDex = 0;                     // use pre-allocated
full CoverageMap
                    pix.coverage = 1.0f;
                }
                else
                {                                       // else we need to allocate a
CoverageMap
                    int32 mapDex = pushMap(context.cMap, y);             // from the
context's coverage map.
                    pix.mapDex = mapDex;
                    pix.coverage = context.cMap.v[3] * (1.0f / 256.0f);
                }
                int32 thisDex = pushPix(pix, y);               // save the CoverPix
to the list
                buff[0] = thisDex;                     // place the CoverPix
index in buffer
            }
            else
            {
                int32 nextDex = buff[0];                    // the current index
                bool hidden = pixes[nextDex].depth < depth &&                  // fast return on
occulution.
                    pixes[nextDex].color[3] > 0.999f &&
                    pixes[nextDex].coverage > 0.999f;
                if (!hidden)
                {
                    int32* lastRef = buff;                   // the forward link to
fix.
                    int32 curDex = nextDex;
                    float zDiff = pixes[nextDex].depth - depth;
                    while (nextDex >= 0 &&                       // traverse list for
insertion sort.
                        (pixes[nextDex].depth - depth) > -gCoverage bufferZTolerance)
                    {
                        curDex = nextDex;
                        zDiff = pixes[curDex].depth - depth;
                        nextDex = pixes[curDex].next;               // update the current
index.
                        lastRef = &pixes[curDex].next;              // update the
forward link
                    }
                    bool sameSurface = curDex >= 0 &&
                        pixes[curDex].surfId == shader.id &&
                        embree::abs(zDiff) < gCoverage bufferZTolerance;
                    if (sameSurface)
```

-continued

```
        {
            CoverageMap& currentMap = context.cMap;
            float currentCoverage = currentMap.v.w * (1.0f / 255.0f);
            float combinedCoverage = currentCoverage +
pixes[curDex].coverage;
            sameSurface = combinedCoverage <= 1.1f;
            if (!sameSurface)
            {
                if (zDiff > 0)
                {
                    curDex = nextDex;
                }
            }
        }
        if (sameSurface )
        {
                                                // Pixels at the same depth
and with the same surfId
                                                // are treated as the same
surface.
            CoverageMap& currentMap = context.cMap;
            if (pixes[curDex].coverage < 1.0f)            // if surface not
already shaded....
            {                                   // we need to combine
sub-pixel coverage.
                float c0 = currentMap.v.w;               // c0 is the
coverage of the source in subpixels (0...256)
                {
                    float c1 = pixes[curDex].coverage;        // c1 is the
coverage of the destination map
                    CoverageMap& destMap =
                        maps[pixes[curDex].mapDex];
                    CoverageMap temp = destMap;
                    temp.difference(currentMap);
                    float c2 = temp.area( );                  // c2 =
pixes[curDex].map – currentMap;
                    {
                        float sum = c2 + c0;              // sum is total
coverage of combined maps
                        if (sum)
                        {
                            shader.shadePixel(context);
                            c0 = c0 / sum;                 // c1 is now the
source contribution
                            c2 = c2 / sum;                 // c2 is now the dest
contribution.
                            pixes[curDex].color =
                                pixes[curDex].color * c2 +
                                context.pixel * c0;                 // calc the new
dest color
                            currentMap.combine(destMap);            // union the
src and dest maps.
                            currentMap.v.w = currentMap.area( );          // update
the map's area
                            if (currentMap.v.w != 256)            // if not full
coverage
                            {
                                if (pixes[curDex].coverage == 256)        // if the
existing map used pre-allocated full coverage...
                                {
                                        // allocate a new map
                                    pixes[curDex].coverage =
                                        currentMap.v.w * (1.0f / 256.0f);
                                    int32 mapDex = pushMap(currentMap, y);
                                    pixes [curDex].mapDex = mapDex;
                                }
                                else
                                {
                                    pixes[curDex].coverage =
                                        currentMap.v.w * (1.0f / 256.0f);
                                    destMap = currentMap;              // if it is
already an allocated map, just set it.
                                }
                            }
                            else
                            {
                                pixes[curDex].mapDex = 0;            // it is full
coverage, so use pre-allocated full coverage map.
                                pixes[curDex].coverage = 1.0f;
```

-continued

```
                        if (pixes[curDex].color[3] > 0.999f)
                        {
                            buff[0] = curDex;
                        }
                      }
                    }
                  }
                }
              }
            }
          else
          {
              // the new pixel does not match a destination map level.
              shader.shadePixel(context);                        // shade the pixel
              CoverPix pix;
              pix.color = context.pixel;
              pix.depth = depth;
              pix.setOp(shader.blendMode);
              pix.next = nextDex;
              pix.surfId = shader.id;
              if (context.cMap.v.w == 256)                       // if it is full
coverage...
              {
                  pix.mapDex = 0;                                // use the pre-
allocated map.
                  pix.coverage = 1.0f;
              }
              else
              {                                                  // need to allocate a
coverage map...
                  pix.coverage =
                      context.cMap.v.w * (1.0f / 256.0f);
                  int32 mapDex = pushMap(context.cMap, y);
                  pix.mapDex = mapDex;                           // set the pointer.
              }
              int32 thisDex = pushPix(pix, y);                   // allocate the pixel
              *lastRef = thisDex;                                // link into the list
              if (context.cMap.v.w == 256)                       // if it is full
coverage...
              {
                  if (pix.color[3] > 0.999f)                     // if it is opaque...
                  {
                      buff[0] = thisDex;                         // drop all further
pixels.
                  }
              }
            }
          }
        }
      }
    }
  }
```

Piecewise fitting based on coverage is performed if the pixels are on the same surface. Piecewise fitting is performed using the Boolean operations provided by the CoverageMap service. These calculations, intersect, difference, and combine may be performed using single inline scalar instructions. Note that the "z" linked list is sorted furthest from the view to closest. This allows to quickly reject the occultation and is the same order the pixels will be composited.

Once all the polygons have been scan converted, and the Coverage buffer is fully set, it may be traversed and composited into the final image. This is done by traversing each pixel's linked list, applying compositions in the linked order.

An example of pseudo code of one possible implementation of this compositing for the Coverage buffer is described below:

```
/**
 * Composite each pixel list in the Coverage buffer to a destination image.
 * @param the destination image.
 */
void compositeCoverage(cv::Mat& dest, embree::Vector4f fillColor)
{
    ___m128i shuffle32to8;
    shuffle32to8.m128i__u64[0] = 0x808080800C080400;
    shuffle32to8.m128i__u64[1] = 0x8080808080808080;
    CoverageMap fillMap;
    if (fillColor[3] > 0.0)
    {
```

-continued

```
        fillMap = CoverageMap(0xffffffffffffffff);
        fillMap.v = embree::Vector4f(0, 0, 0, 256.0f);
    }
    else
    {
        fillMap = CoverageMap(0);
        fillMap.v = embree::Vector4f(0, 0, 0, 0);
    }
    if (dest.cols == coverBuff.cols &&
        dest.rows == coverBuff.rows)                    // size must match
    {
        if(dest.type( ) == CV__8UC4)                    // if dest is 8bit 4
channel...
        {
            int32* srcBuff = (int32*)coverBuff.ptr( );
            int32 coverStride = coverBuff.step[0] / sizeof(int32);
            uint32* destBuff = (uint32*)dest.ptr( );
            int32 destStride = dest.step[0] / sizeof(uint32);
            for (int32 i = 0; i < dest.rows; i++)       // traverse the rows
            {
                MapList& maps = mapLists[i];
                PixList& pixes = pixLists[i];
                int32 tempMapDex = maps.size( );
                maps.push__back(fillMap);
                int32* srcScan = srcBuff;
                uint32* dstScan = destBuff;
                for (int32 j = 0; j < dest.cols; j++)   // traverse the columns.
                {
                    int32 currPix = srcScan[0];
                    CoverPix destPix;
                    maps[tempMapDex] = fillMap;
                    destPix.color = fillColor;
                    destPix.coverage = fillMap.v.w * 1.0f / 256.0f;
                    destPix.depth = HUGE__VALF;
                    destPix.mapDex = tempMapDex;
                    while (currPix >= 0)                // traverse
the CoverPix list.
                    {
                        CoverPix::compositeCoverage(pixes[currPix], destPix, maps);
                        currPix = pixes[currPix].next;  //
advance to next CoverPix.
                    }
                    destPix.color =
                        embree::min(destPix.color, embree::Vector4f(1.0f)); //
clip to 1.0.
                    ___m128i dest8bit =
                        __mm__cvtps__epi32(destPix.color * 255.0f);  //
convert from floats to 32 bit integers
                    dest8bit =
                        __mm__shuffle__epi8(dest8bit, shuffle32to8);  // convert
from 32 bit integers to unsigned 8 bit components.
                    dstScan[0]= dest8bit.m128i__u32[0];  // set the
dest
                    srcScan++;                           // step to next
pixel in scanline
                    dstScan++;
                }
                srcBuff += coverStride;                  // step to next
scanline.
                destBuff += destStride;
            }
        }
    }
}
```

In some embodiments, all shaded values are pre-multiplied by alpha, and top pixel's coverage*alpha is used as a combined scalar for applying a PixCover's shaded value.

In some embodiments, complex scenes may be composed using piecewise surface occlusion using techniques similar to those described for piecewise fitting.

In some embodiments, the compositing operations may be described by enumeration. An example is described below:

```
// blend mode for compositing within Coverage buffer.
enum BlendMode
{
    Over = 0,   // dst = (src * src.alpha) + (dst * (1−src.alpha))
    Mul = 1,    // dst = dst * src;
    Copy = 2,   // dst = src
    Add = 3,    // dst = dst + src;
    Sub = 4,    // dst = dst−src;
    Min = 5,    // dst = MIN(src,dst);
    Max = 6,    // dst = MAX(src,dst);
};
```

After rendering using the presented high quality rendering approach, the rendered image is shown as element 134 described in FIG. 3, which corresponds to the image (element 134), generated using a different approach and is shown in FIG. 2 in U.S. Pat. No. 8,175,931 B2. It is worth noting that the sub-pixel rendering portion of the rendering adds about 20% to the rendering time while providing a virtual 16× in linear resolution.

7.0 Example Method for High Quality Renderings of Synthetic Views of Custom Products In some embodiments, a method for high quality renderings of synthetic view of custom manufactured product comprises rendering of an image of the custom manufactured product where instructions for manufacturing the product are provided by a ProductOption framework composed of a set of constrained key-value pairs.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship. The product option framework event chain may include one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

The ProductOption key-value pairs may be used to automatically present an interface to a user. The ProductOption key-values pairs may be set, or changed, based on actions, or input, provided by a user.

In some embodiments, a calibrated product rendering asset is rendered as an image of the custom manufactured product by applying key-value pairs. The key-value pairs may set at least one of: a color or a color map of the rendering asset, a texture or the textural surface of the rendering asset, an image representing an ornamentation or pattern on the product, or the size relationships of the geometry of the rendering asset.

The high quality rendering method presented herein utilizes a scan-converting geometry at pixel resolution. Furthermore, the sub-pixel coverage is evaluated using the edge evaluation performed by a dot product scalar instruction. Moreover, the sub-pixel coverage is evaluated using binary arrays of at least 16×16 using scalar instructions.

8.0 Example Rendering Flow

Figure 4A:
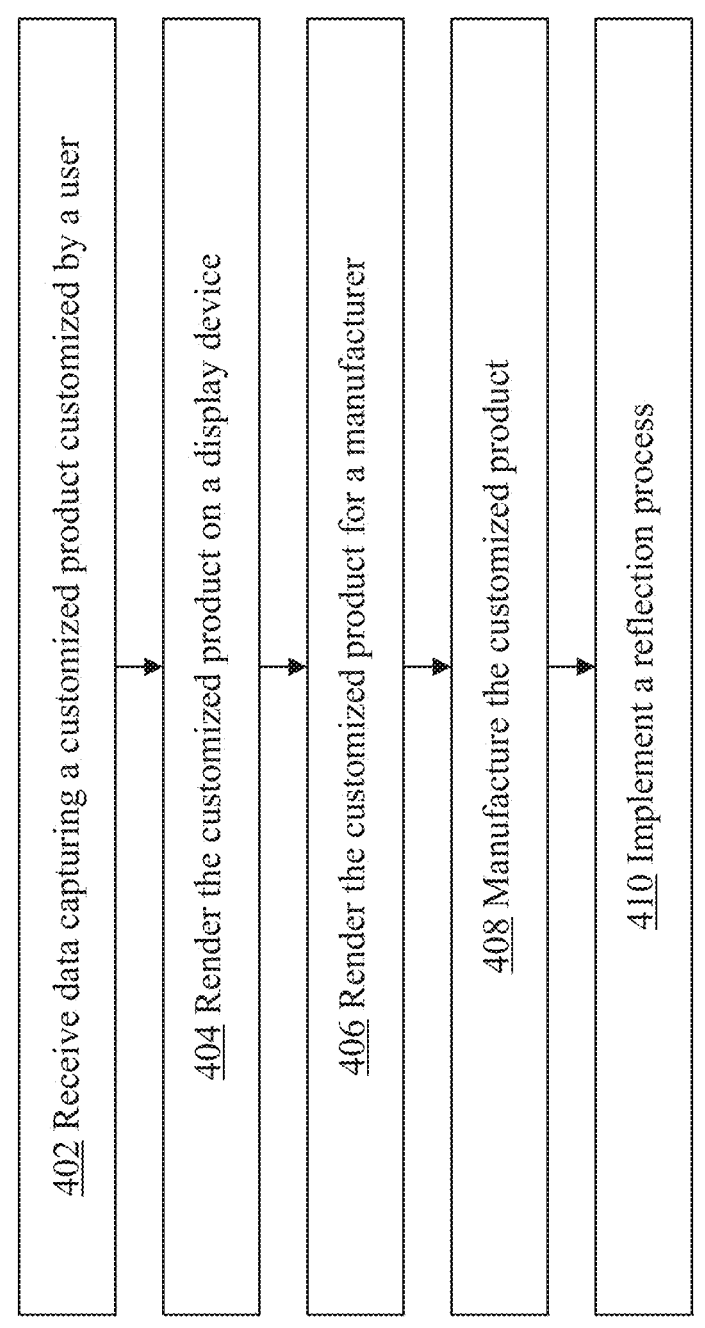
FIG. 4 illustrates an example processing flow for rendering synthetic images, according to some embodiments.

FIG. 4A illustrates an example processing flow for rendering synthetic images, according to some embodiments. The process allows manufacturing the user designed products and includes applying the user created colors and designs to the products made out of, for example, flat pattern pieces of fabric and sewn together. The steps described in FIG. 4 may be performed by a product customization system implemented in, for example, product synthetic view rendering platform 101 described in FIG. 1A.

In step 402, a product customization system receives data capturing a customized product. The product customization system may, for example, provide a user interface allowing a user to customize the product. Then the product customization platform may receive the data capturing the customized product via the user interface. The interface may be implemented as one or more web pages. The user interface allows the user to interactively apply colors, tiled images, and photographic or designed images to two-dimensional pattern pieces that comprise the product. The data generated by the user interface may include user account data, a product description (that describes the user's custom product), user image designs (that contains the user content), color choices (the color(s) chosen by the user), material choices (the type of material for the custom product) and the finishing choices (the finishing selected by the user for the custom product). The user interface may be configured to assemble a set of instructions that describe the user design and to request the images of the final product from the user product renderer.

In step 404, the product customization system renders the customized product for the user using a user product renderer implementing the high quality rendering approach presented herein. The user product renderer may receive the data/information/description of the two dimensional pattern pieces (based on the user interactions with the user interface portion) and other user preferences and using information supplied by, for example, a reflection module. The reflection module may be configured to generate calibrated color maps and calibrated luminance maps to the calibrated product render assets (including geometry, luminance maps, color maps and safe area coverage maps) that are used to generate the images for the product. Then the renderer may synthesize an image of the final cut and stitch manufactured product that is then displayed to the user/consumer.

In step 406, the product customization system renders the customized product for a manufacturer using the manufacturing product renderer implementing the high quality rendering approach presented herein. The manufacturing product renderer may receive the data/information/description of the two dimensional pattern pieces, other user preferences and information supplied by the reflection module and prepare the image pattern files, cutting files, and operator directions used by a manufacturing module.

In step 408, the product customization system sends the customized product to a manufacturer, which uses the manufacturing equipment to manufacture the customized product. The manufacturing may include, for example, the following processes: 1) manufacture the flat pattern pieces using the image pattern files and cutting files; 2) sew the pattern pieces based on the operator directions; 3) perform finishing steps; 4) ship the product based on the operator directions; and/or 5) gather product information for the reflection portion (including patterns, reference product with calibration markup and/or color and material samples) that are input to a model-shot processing component that may perform, for example, various model-shot processing tasks.

In step 410, the product customization system performs the reflection process using the reflection module. The reflection module may be a portion of the system that provides feedback to the other portions of the systems. The reflection module may perform, for example, the following tasks: 1) provide updated product patterns to the manufacturing product renderer portion (the calibrated patterns and visible area layouts); 2) manufacture reference product used by the user product renderer portion (the calibrated patterns and visible area layouts); 3) calibrate pattern position with the manufacturer's reference product; 4) provide calibrated photographic references of reference product to the user product renderer portion; and/or 5) provide calibrated reflectance and color mapping for the user product renderer portion (the calibrated color maps and calibrated luminance maps).

FIG. 4B illustrates an example processing flow for rendering synthetic images, according to some embodiments. More specifically, FIG. 4B depicts the steps of a data processing method for generating a synthetic view rendering.

The steps described in FIG. 4B may be performed by a product customization system implemented in, for example, product synthetic view rendering platform 101 described in FIG. 1A.

In step 422, a rendering platform initializes, for a digital asset, a coverage mapping array. Each member of the coverage mapping array represents a possible coverage of sub-pixel regions of a pixel. Furthermore, each member of the coverage mapping array can be held in a scalar instruction register of a computer microprocessor. The details of the coverage mapping arrays were described above.

In step 424, the rendering platform determines a contribution of a triangle to a pixel region. This is performed by calculating (step 426) a distance of each edge of the triangle from a center of a sub-pixel using a single scalar set instruction register operating on two scalar instruction set registers; using the distance and an angle of the edge to select a member of the coverage mapping array; and combining (step 428) pairs of found members of the coverage mapping array using the single scalar set instruction, operating on the pair, to assemble a sub-pixel coverage map array.

In step 430, the rendering platform renders the pixel using the sub-pixel coverage mapping array and the sub-pixel regions of the pixel.

The rendering details were described above.

9.0 Manufacturing

A manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework builds an interface for key-value pairs called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input Key ValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input Key ValueJournal's UUID.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

10.0 Implementation Mechanism-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
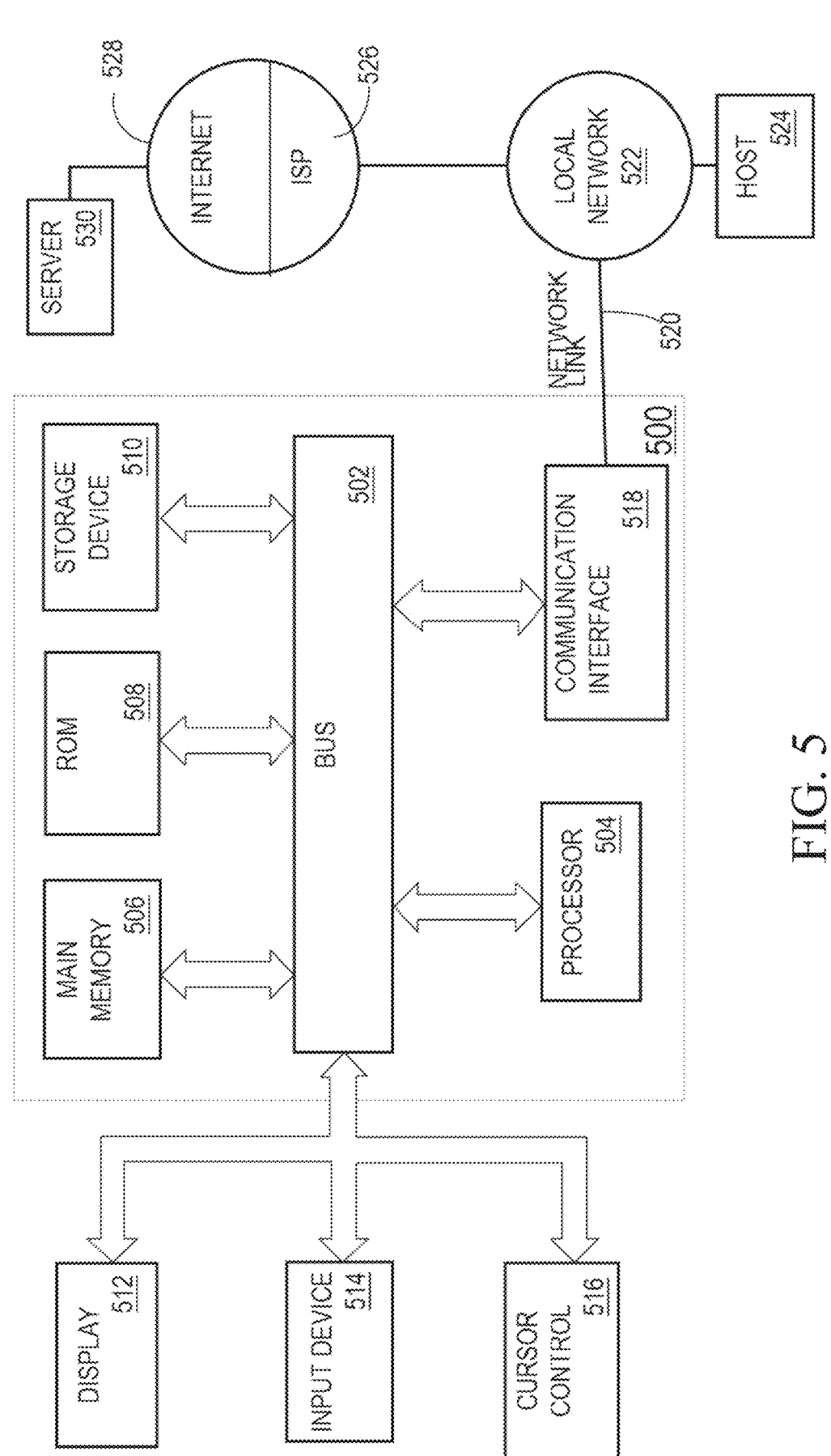
FIG. 5 is a block diagram that illustrates a computer system with which the techniques herein may be implemented.

For example, FIG. 5 is a block diagram that illustrates a computer system 500. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11.0 Extensions and Alternatives

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing method for generating a synthetic view rendering, the method comprising:

initializing, for a digital asset, a coverage mapping array;

wherein each member of the coverage mapping array represents a possible coverage of sub-pixel regions of a pixel;

wherein each member of the coverage mapping array can be held in a scalar instruction register of a computer microprocessor;

determining a contribution of a triangle to a pixel region by:

calculating a distance of each edge of the triangle from a center of a sub-pixel using a single scalar set instruction, operating on a pair of two scalar instruction set registers;

using the distance and an angle of the edge to select a member of the coverage mapping array;

combining pairs of found members of the coverage mapping array using the single scalar set instruction, operating on the pair, to assemble a sub-pixel coverage map array;

rendering the pixel using the sub-pixel coverage mapping array and the sub-pixel regions of the pixel.

2. The data processing method of claim 1, further comprising:

generating a final image by:

initializing a coverage buffer;

for each surface of a calibrated product rendering asset:

biding one or more surface appearance assets to the surface to generate a converted surface;

scanning the converted surface to generate a plurality of pixel samples and storing the plurality of pixels samples in the coverage buffer;

evaluating the plurality of pixel samples to generate and update the coverage mapping array;

converting the coverage mapping array to the final image.

3. The data processing method of claim 2, wherein the coverage mapping array provides an evaluation of an ImplicitTriangle and provides a map for a 16×16 sub pixel area;

wherein the coverage buffer is a 2D array of 32 bit integers that are a start of an indexed list of CoverPix structures.

4. The data processing method of claim 2, wherein the calibrated product rendering asset is generated by creating a digital representation of a referenced physical product;

wherein the referenced physical product is generated using designated colors and patterns;

wherein the designated colors and patterns include markups;

wherein a markup is used to construct geometry, design areas, masks, local surface shadings, and global luminance shadings in the digital representation of the referenced physical product;

wherein the geometry, and the global luminance shadings are captured using a plurality of product option parametric key-values.

5. The data processing method of claim 4, further comprising applying the plurality of product option parametric key-values to the digital asset by:

setting a substrate, trim, and key-values to the plurality of product option parametric key-values associated with color or textural appearance of the referenced physical product;

wherein a substrate corresponds to a material from which the referenced physical product is made;

wherein the color and textual appearance are set by references;

wherein the trim is defined by trim geometry features and trim placements;

wherein the trim geometry features and the trim placements are transformed by fitting a framing or an edging to the trim geometry features and setting physical profiles of the framing or the edging.

6. The data processing method of claim 4, wherein applying the plurality of product option parametric key-values to the digital asset comprises: generating a plurality of design areas associated with the calibrated product renderings asset, rendering an image in a design area, of the plurality of design areas, using a design U-V geometry specified by a markup.

7. The data processing method of claim 4, wherein applying the plurality of product option parametric key-values to the digital asset comprises:

setting the plurality of product option parametric key-values by transforming geometry features and placements associated with the calibrated product rendering asset;

wherein keys of the plurality of product option parametric key-values include one or more of: a product height, a product width, a product depth, a product circumference, a placement of designs, a design height, or a design width;

wherein setting the plurality of product option parametric key-values comprises setting geometry transforms to a specific view and setting in-situ transforms;

wherein for each polygon in the calibrated product rendering asset, a hybrid scanline and an implicit structure are built;

wherein building the implicit structure comprises determining triangle points, triangle deltas, and implicit triangles for the calibrated product rendering asset.

8. A raster cover computer system, comprising:

a memory unit;

one or more processors; and a raster cover computer performing:

initializing, for a digital asset, a coverage mapping array;

wherein each member of the coverage mapping array represents a possible coverage of sub-pixel regions of a pixel;

wherein each member of the coverage mapping array can be held in a scalar instruction register of a computer microprocessor;

determining a contribution of a triangle to a pixel region by:

calculating a distance of each edge of the triangle from a center of a sub-pixel using a single scalar set instruction, operating on a pair of two scalar instruction set registers;

using the distance and an angle of the edge to select a member of the coverage mapping array;

combining pairs of found members of the coverage mapping array using the single scalar set instruction, operating on the pair, to assemble a sub-pixel coverage map array;

rendering the pixel using the sub-pixel coverage mapping array and the sub-pixel regions of the pixel.

9. The raster cover computer system of claim 8, wherein the raster cover computer further generates a final image by:

initializing a coverage buffer;

for each surface of a calibrated product rendering asset:

biding one or more surface appearance assets to the surface to generate a converted surface;

scanning the converted surface to generate a plurality of pixel samples and storing the plurality of pixels samples in the coverage buffer;

evaluating the plurality of pixel samples to generate and update the coverage mapping array;

converting the coverage mapping array to the final image.

10. The raster cover computer system of claim 9, wherein the coverage mapping array provides an evaluation of an ImplicitTriangle and provides a map for a 16×16 sub pixel area;

wherein the coverage buffer is a 2D array of 32 bit integers that are a start of an indexed list of CoverPix structures.

11. The raster cover computer system of claim 9, wherein the calibrated product rendering asset is generated by creating a digital representation of a referenced physical product;

wherein the referenced physical product is generated using designated colors and patterns;

wherein the designated colors and patterns include markups;

wherein a markup is used to construct geometry, design areas, masks, local surface shadings, and global luminance shadings in the digital representation of the referenced physical product;

wherein the geometry, and the global luminance shadings are captured using a plurality of product option parametric key-values.

12. The raster cover computer system of claim 11, storing additional instructions for applying the plurality of product option parametric key-values to the digital asset comprises:

setting a substrate, trim, and key-values to the plurality of product option parametric key-values associated with color or textural appearance of the referenced physical product;

wherein a substrate corresponds to a material from which the referenced physical product is made;

wherein the color and textual appearance are set by references;

wherein the trim is defined by trim geometry features and trim placements;

wherein the trim geometry features and the trim placements are transformed by fitting a framing or an edging to the trim geometry features and setting physical profiles of the framing or the edging.

13. The raster cover computer system of claim 11, wherein applying the plurality of product option parametric key-values to the digital asset comprises: generating a plurality of design areas associated with the calibrated product renderings asset, rendering an image in a design area, of the plurality of design areas, using a design U-V geometry specified by a markup.

14. The raster cover computer system of claim 11, wherein applying the plurality of product option parametric key-values to the digital asset comprises:

setting the plurality of product option parametric key-values by transforming geometry features and placements associated with the calibrated product rendering asset;

wherein keys of the plurality of product option parametric key-values include one or more of: a product height, a product width, a product depth, a product circumference, a placement of designs, a design height, or a design width;

wherein setting the plurality of product option parametric key-values comprises setting geometry transforms to a specific view and setting in-situ transforms;

wherein for each polygon in the calibrated product rendering asset, a hybrid scanline and an implicit structure are built;

wherein building the implicit structure comprises determining triangle points, triangle deltas, and implicit triangles for the calibrated product rendering asset.

15. One or more computer-readable non-transitory data storage media storing one or more sequences of instructions which, when executed by one or more computer processors, cause the one or more computer processors to perform:

initializing, for a digital asset, a coverage mapping array;

wherein each member of the coverage mapping array represents a possible coverage of sub-pixel regions of a pixel;

wherein each member of the coverage mapping array can be held in a scalar instruction register of a computer microprocessor;

determining a contribution of a triangle to a pixel region by:

calculating a distance of each edge of the triangle from a center of a sub-pixel using a single scalar set instruction, operating on a pair of two scalar instruction set registers;

using the distance and an angle of the edge to select a member of the coverage mapping array;

combining pairs of found members of the coverage mapping array using the single scalar set instruction, operating on the pair, to assemble a sub-pixel coverage map array;

rendering the pixel using the sub-pixel coverage mapping array and the sub-pixel regions of the pixel.

16. The one or more computer-readable non-transitory data storage media of claim 15, storing additional instructions for generating a final image by:

initializing a coverage buffer;

for each surface of the calibrated product rendering asset:

biding one or more surface appearance assets to the surface to generate a converted surface;

scanning the converted surface to generate a plurality of pixel samples and storing the plurality of pixels samples in the coverage buffer;

evaluating the plurality of pixel samples to generate and update the coverage mapping array;

converting the coverage mapping array to the final image.

17. The one or more computer-readable non-transitory data storage media of claim 16, wherein the coverage mapping array provides an evaluation of an ImplicitTriangle and provides a map for a 16×16 sub pixel area;

wherein the coverage buffer is a 2D array of 32 bit integers that are a start of an indexed list of CoverPix structures.

18. The one or more computer-readable non-transitory data storage media of claim 16, wherein the calibrated product rendering asset is generated by creating a digital representation of a referenced physical product;

wherein the referenced physical product is generated using designated colors and patterns;

wherein the designated colors and patterns include markups;

wherein a markup is used to construct geometry, design areas, masks, local surface shadings, and global luminance shadings in the digital representation of the referenced physical product;

wherein the geometry, and the global luminance shadings are captured using a plurality of product option parametric key-values.

19. The one or more computer-readable non-transitory data storage media of claim 18, storing additional instructions for applying the plurality of product option parametric key-values to the digital asset comprises:

setting a substrate, trim, and key-values to the plurality of product option parametric key-values associated with color or textural appearance of the referenced physical product;

wherein a substrate corresponds to a material from which the referenced physical product is made;

wherein the color and textual appearance are set by references;

wherein the trim is defined by trim geometry features and trim placements;

wherein the trim geometry features and the trim placements are transformed by fitting a framing or an edging to the trim geometry features and setting physical profiles of the framing or the edging.

20. The one or more computer-readable non-transitory data storage media of claim 18, wherein applying the plurality of product option parametric key-values to the digital asset comprises: generating a plurality of design areas associated with the calibrated product renderings asset, rendering an image in a design area, of the plurality of design areas, using a design U-V geometry specified by a markup.

\*    \*    \*    \*    \*